US006627835B1

(12) United States Patent
Chung et al.

(10) Patent No.: US 6,627,835 B1
(45) Date of Patent: Sep. 30, 2003

(54) THREE DIMENSIONAL OBJECT FABRICATION TECHNIQUES

(75) Inventors: Chan Woo Chung, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 95 days.

(21) Appl. No.: 09/776,534

(22) Filed: Feb. 2, 2001

Related U.S. Application Data
(60) Provisional application No. 60/179,625, filed on Feb. 2, 2000.

(51) Int. Cl.[7] .................. B23H 7/02; B23K 26/38
(52) U.S. Cl. ................ 219/69.12; 219/69.17; 219/121.72; 700/162; 700/166
(58) Field of Search ................ 700/162, 166; 219/121.85, 69.17, 121.67, 121.72

(56) References Cited

U.S. PATENT DOCUMENTS

| 4,752,352 | A | * | 6/1988 | Feygin ............... 219/121.85 |
| 4,843,203 | A | * | 6/1989 | Gamo et al. ........... 219/69.17 |
| 4,851,633 | A | | 7/1989 | Buhler ................ 219/69.12 |
| 5,031,483 | A | * | 7/1991 | Weaver |
| 5,243,165 | A | | 9/1993 | Hosaka ............... 219/69.12 |
| 5,286,573 | A | | 2/1994 | Prinz et al. ............ 428/457 |
| 5,301,415 | A | | 4/1994 | Prinz et al. ............ 29/458 |
| 5,357,073 | A | | 10/1994 | Tominaga et al. ....... 219/69.15 |
| 5,398,193 | A | * | 3/1995 | deAngelis |
| 5,432,704 | A | | 7/1995 | Vouzelaud et al. |
| 5,453,933 | A | | 9/1995 | Wright et al. .......... 364/474.23 |
| 5,458,825 | A | | 10/1995 | Grolman et al. ......... 264/401 |
| 5,514,232 | A | | 5/1996 | Burns ................ 156/64 |
| 5,545,367 | A | | 8/1996 | Bae et al. ............. 264/401 |
| 5,581,672 | A | * | 12/1996 | Letcher, Jr. |
| 5,594,652 | A | | 1/1997 | Penn et al. |
| 5,596,504 | A | | 1/1997 | Tata et al. |
| 5,614,075 | A | | 3/1997 | Andre, Sr. ............ 205/67 |
| 5,616,293 | A | | 4/1997 | Ashtiani-Zarandi et al. 264/401 |
| 5,637,175 | A | | 6/1997 | Feygin et al. .......... 156/264 |
| 5,641,391 | A | | 6/1997 | Hunter et al. .......... 205/80 |
| 5,645,977 | A | | 7/1997 | Wu et al. ............. 430/320 |
| 5,649,277 | A | | 7/1997 | Greul et al. ........... 419/2 |
| 5,659,478 | A | * | 8/1997 | Pennisi et al. |
| 5,663,883 | A | | 9/1997 | Thomas et al. ......... 364/468.26 |

(List continued on next page.)

FOREIGN PATENT DOCUMENTS

| WO | WO 99/59800 | 11/1999 |
| WO | WO 00/57253 | 9/2000 |

OTHER PUBLICATIONS

Imre Horvath, Joris SM Vergeest, Johan J. Broek, Zoltan Rusak, and Bram de Smith, "Tool profile and tool path calculation for free–form thick–layered fabrication," Computer–Aided Design, vol. 30, No. 14, pp 1097–1110, 1999.

T. Himmer, T. Nakagawa, and M. Anzai, "Lamination of metal sheets," Computers in Industry, vol. 39, pp. 27–33, 1999.

Justin Tyberg and Jan Helge Bohn, "FDM systems and local adaptive slicing," Material and Design, vol. 20, pp. 77–82, 1999.

(List continued on next page.)

*Primary Examiner*—Geoffrey S. Evans
(74) *Attorney, Agent, or Firm*—William F. Bahret

(57) ABSTRACT

Method and apparatus for making an object. The invention includes the division of a shape of an object into a plurality of layers, and arranging the thickness of the layers based on the curvature of the object to be made. Further, curving edges of the object are replaced with linear sloping edges on the layers. The invention reduces the cost and improves the speed of rapid prototyping, especially with machining methods such as wire electrodischarge machining and laser machining.

27 Claims, 17 Drawing Sheets

U.S. PATENT DOCUMENTS

| | | | |
|---|---|---|---|
| 5,718,279 A | 2/1998 | Satoh et al. | 164/456 |
| 5,745,834 A | 4/1998 | Bampton et al. | 419/37 |
| 5,783,340 A | 7/1998 | Farino et al. | 430/22 |
| 5,793,015 A * | 8/1998 | Walczyk | 219/121.67 |
| 5,805,971 A | 9/1998 | Akedo | 419/6 |
| 5,818,005 A | 10/1998 | Pratt et al. | 219/69.15 |
| 5,818,718 A | 10/1998 | Thomas et al. | |
| 5,819,388 A | 10/1998 | Salm | 29/424 |
| 5,824,250 A | 10/1998 | Whalen et al. | 264/219 |
| 5,866,058 A | 2/1999 | Batchelder et al. | 264/237 |
| 5,872,714 A | 2/1999 | Shaikh et al. | 364/468.04 |
| 5,876,550 A | 3/1999 | Feygin et al. | 156/264 |
| 5,901,593 A | 5/1999 | Fritz | 72/15.2 |
| 5,907,768 A | 5/1999 | Malta et al. | 438/105 |
| 5,919,380 A | 7/1999 | Magara et al. | 219/69.16 |
| 5,922,187 A | 7/1999 | Fornera et al. | 205/640 |
| 5,940,674 A | 8/1999 | Sachs | 419/2 |
| 6,021,358 A | 2/2000 | Sachs | 700/98 |
| 6,056,843 A | 5/2000 | Morita et al. | 156/250 |
| 6,084,980 A | 7/2000 | Nguyen et al. | 382/154 |
| 6,116,888 A | 9/2000 | Johnston et al. | 425/195 |
| 6,136,132 A | 10/2000 | Kinzie | 156/258 |
| 6,155,331 A | 12/2000 | Langer et al. | 164/456 |

OTHER PUBLICATIONS

Yongnian Yan, Renji Zhang, Guodong Hong, and Xiaomeng Yuan, "Research on the bonding of material paths in melted extrusion modeling," Materials and Design, vol. 21, pp. 93–99, 2000.

Minyang Yang and Eungki Lee, "NC verification for wire–EDM using an R–map," Computer–Aided Design, vol. 28, No. 9, pp. 733–740, 1998.

K. Mani, P. Kulkarni, and D. Dutta, "Region—based adaptive slicing," Computer–Aided Design, vol. 31, pp. 317–333, 1999.

Kwamivi Mawussi and Alain Bernard, "Three–dimensional cutting–tool–path restriction. Applicaiton to ruled surfaces approximated by plane bifacets," Computers in Industry, vol. 35, pp. 247–259, 1998.

Chonglin Liu and Donald Esterling, "Solid modeling of 4–axis wire EDM cut geometry," Computer–Aided Design, vol. 29, No. 12, pp. 803–810, 1997.

B.G. Bryden, I.R. Pashby, D.I. Wimpenny, and C. Adams, "Laminated steel tooling in the aerospace industry," Materials and Design, vol. 21, pp. 403–408, 2000.

H.S. Yan, R.S. Lee and Y.C. Yang, "An Algorithm for Surface Design and Tool Path Generation in Wire–cut Electrical Discharge Machining," Int. J. Mach. Tools Manufact., vol. 35, No. 12, pp. 1700–1714, 1995.

R.L. Hope, R.N. Roth, P.A. Jacobs, "Adaptive Slicing With Sloping Layer Surfaces," Department of Mechanical Engineering, University of Queensland, Brisbane, QLD 4072 Australia.

R.L. Hope, P.A. Jacobs, , R.N. Roth "Rapid Prototyping With Sloping Surfaces," Department of Mechanical Engineering, University of Queensland, Brisbane, QLD 4072 Australia.

* cited by examiner

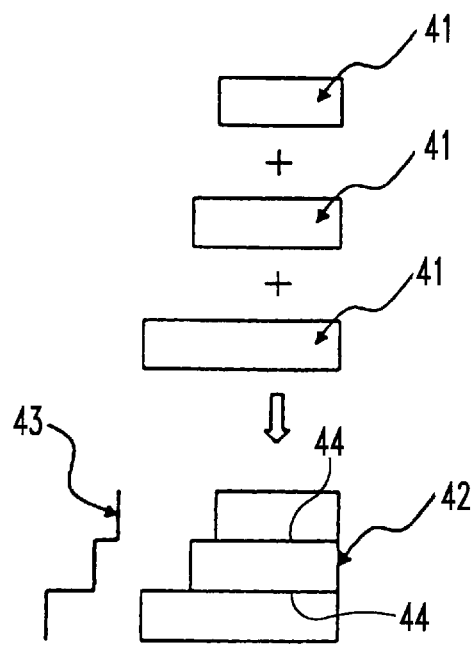
Fig. 1
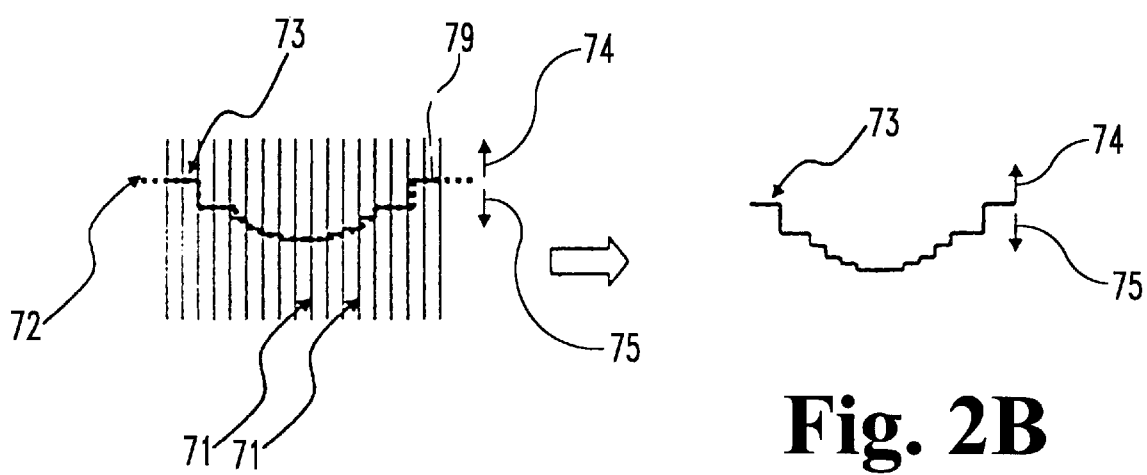
Fig. 2A  Fig. 2B

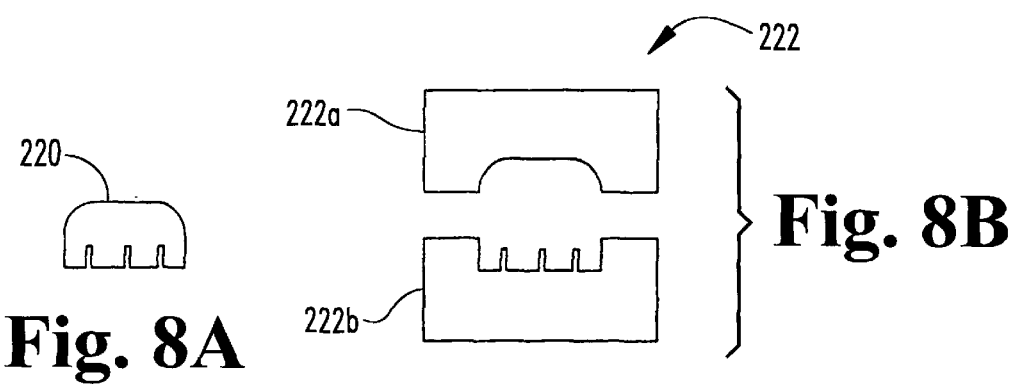
Fig. 8A
Fig. 8B
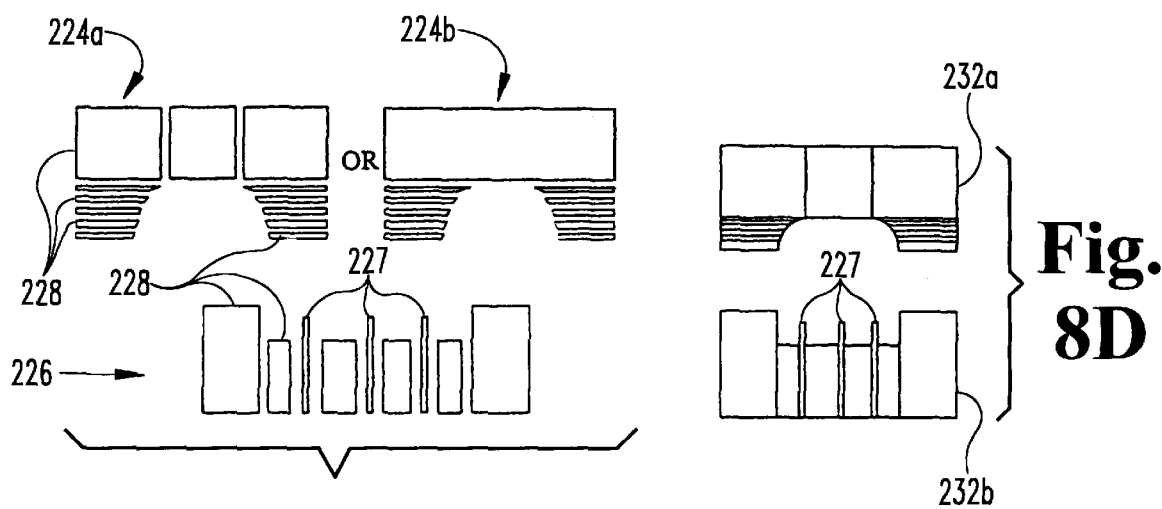
Fig. 8C
Fig. 8D
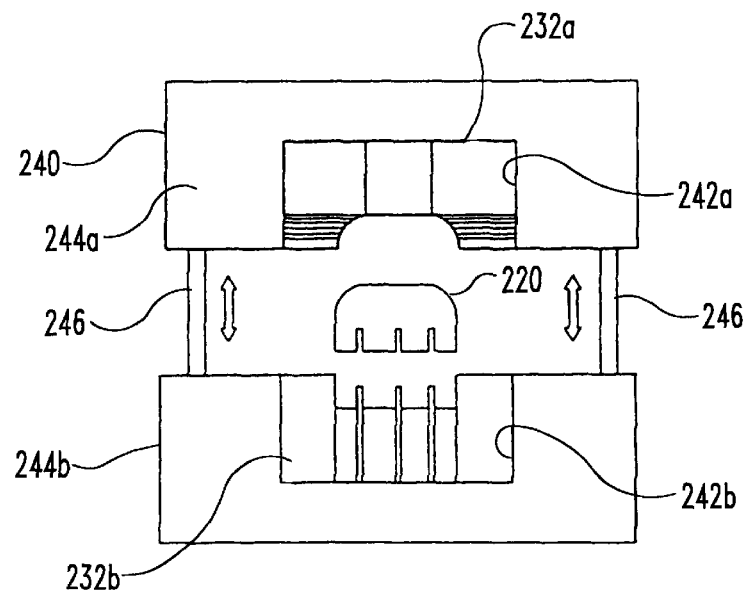
Fig. 8E

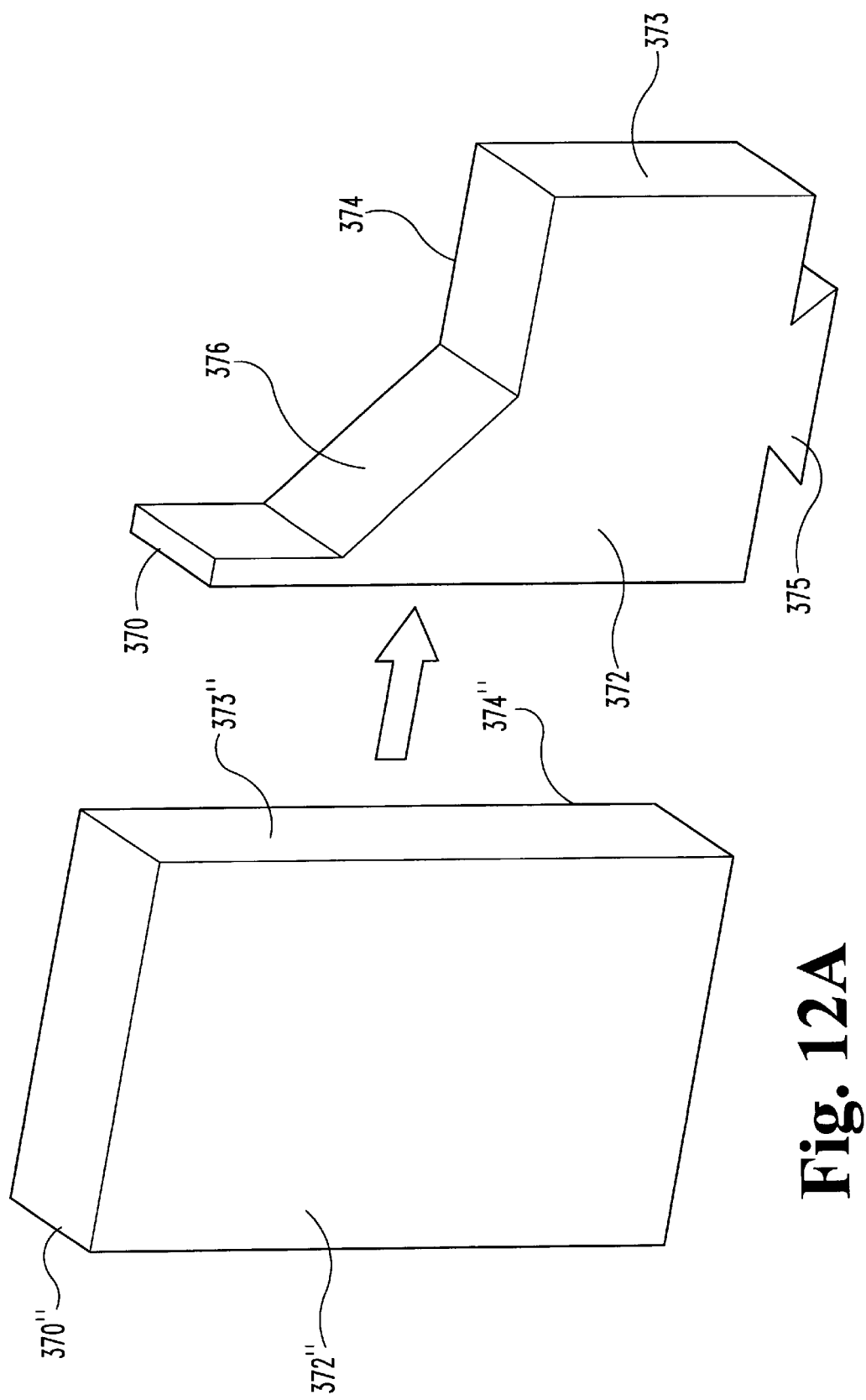

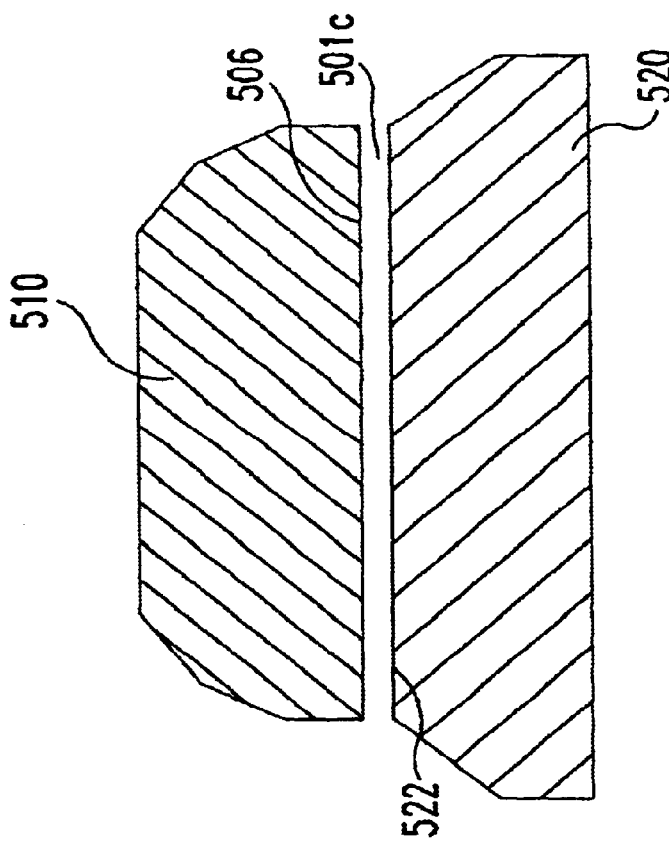
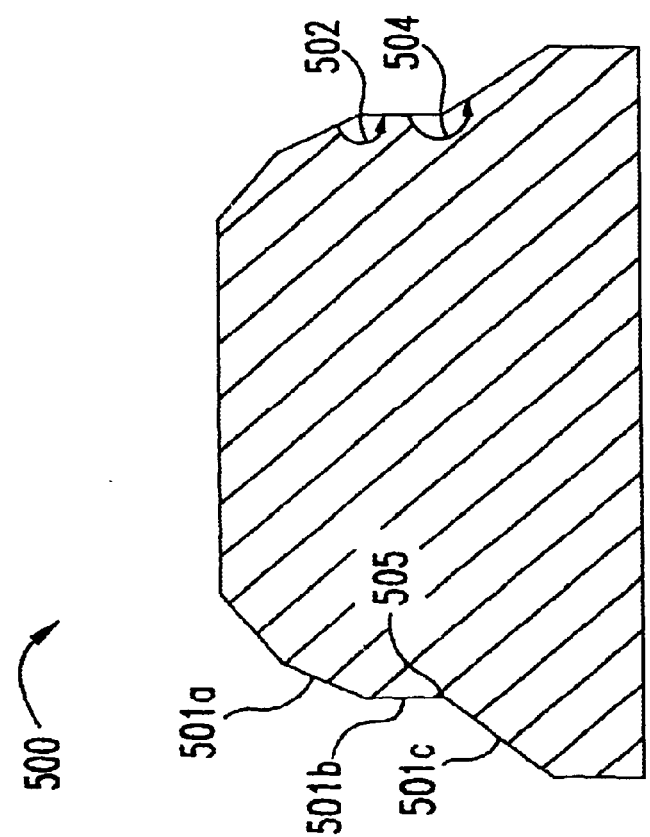
Fig. 13A
Fig. 13B

THREE DIMENSIONAL OBJECT FABRICATION TECHNIQUES

CROSS REFERENCE TO RELATED APPLICATIONS

This application claims the benefit of priority to U.S. Provisional Application Ser. No. 60/179,625, filed Feb. 2, 2000, which is incorporated herein by reference.

BACKGROUND OF THE INVENTION

The present application relates to manufacturing techniques, and more particularly, but not exclusively, relates to techniques for fabricating tooling and other objects. It is further envisioned that the teachings of the present application may be directed to other technological fields.

Several schemes have been developed to fabricate three dimensional (3D) parts with complicated shapes. The direct fabrication of prototype parts using Computer-Aided Design (CAD) systems has received significant attention and commercial development. Five-axis Numeric Control (NC) systems have been developed that can cut parts with shapes of varying complexity. However, such conventional approaches often have many constraints relating to size and/or shape of the part. Furthermore, conventional machining time increases with part complexity and still requires setup time, experienced operators, and tool path generation/verification.

Recent efforts to develop Rapid Prototyping (RP) technology attempt to address these shortcomings. One particularly attractive application of RP-based technology is in the area of tooling fabrication. One scheme uses multiple layer or lamination methods to produce a part that is then used to produce a corresponding tool. Another scheme uses a powder metal sintering process followed by debinding and infiltration. A further scheme includes a secondary tooling method based on plating nickel over plastic stereolithography patterns, then reinforcing the thin, hard nickel face with a stiff ceramic material. Yet another scheme that is under development uses a rapid prototype part to forge a special ceramic powder to produce a die. A further scheme employs Laser Engineered Net Shaping (LENS), which is based on melting a powder stream with a laser. Other schemes are based on a 3D printing process to produce a part or tool that is then post-processed. Unfortunately, these schemes are also limited in terms of accuracy, speed, or the need for special equipment, materials, and post processing.

In the micromachine fabrication arena, Microelectromechanical Structure/Systems (MEMS) technology that was derived from the semiconductor industry typically needs special equipment, suffers from shaping limitations, and is limited to special materials, namely silicon. Because the LIGA method is derived from semiconductor industry, it has similar drawbacks.

Thus, there is a demand for further advancement in these areas of technology.

SUMMARY OF THE INVENTION

One embodiment of the present invention is a unique technique to shape an object. Other embodiments include unique apparatus, methods, systems, and devices to make portions of a mold.

A further embodiment of the present invention pertains to layered molds for the molding of objects in which the various layers of the mold have different thicknesses. In some embodiments, the thicknesses vary according to the curvature of the object being molded, such that thinner layers are used for molding portions of the object with smaller radii of curvature. Conversely, those portions of the object with surfaces having larger radii of curvature are represented in the mold with thicker layers.

Still another embodiment of the present invention includes the shaping of certain portions of the mold surfaces that correspond to two-dimensional curving surfaces of the object. These mold surfaces are designed with sloping linear surfaces, such that the two-dimensionally curving surface of the object is represented by a one-dimensional curving surface on the molded object.

Yet another embodiment of the present invention relates to the construction of a mold with both layers, primitive objects, and segments (segments being a combination of primitive objects joined to layers). The surface portions of the layers, segments, and primitive objects which correspond to two-dimensional curving surfaces of the object are shaped as ruled surfaces into a plurality of solid members. The solid members are shaped by a machining method such as wire eletrodischarge machining and laser machining.

A further embodiment of the present invention comprises a method of assembling a mold. The mold includes a plurality of layers with joining features, the layers being shaped by a machining method such as wire electrodischarge machining, laser machining or similar machining methods which are capable of producing sloping linear surfaces. The joining features are adapted and configured to permit assembly of the solid members into a mold from at least two different directions.

Yet another embodiment of the present invention includes assembling solid members into a mold such that the thinnest solid members are located between thicker members, the thicker members providing increased structural integrity to the assembled mold.

Accordingly, one object of the present invention is to provide a unique method of designing and shaping solid members of a mold.

Another object of the present invention is to provide a unique apparatus, methods, devices, and/or systems to shape objects.

Further objects, embodiments, forms, benefits, aspects, features, and advantages of the present invention can be obtained from the description, drawings, and claims provided herein.

BRIEF DESCRIPTION OF THE DRAWINGS

FIG. 1 is a diagrammatic side view of an object formed by stacking perpendicularly cut layers.

FIGS. 2A and 2B are a diagrammatic side view of another object and a view of the resulting surface contour, respectively.

FIG. 8A is a schematic representation of a product or object.

FIG. 8B is a schematic representation of the shape of a mold for molding the object of FIG. 8A.

FIG. 8C is a schematic representation of the mold shape of FIG. 8B decomposed into various layers and segments according to one embodiment of the present invention.

FIG. 8D is a schematic representation of the layers and segments of FIG. 8C combined into mold halves.

FIG. 8E is a schematic representation of the mold halves of FIG. 8D inserted into a molding machine.

FIG. 12A is a perspective view of a solid member.

FIG. 12B is a perspective view of the solid member of FIG. 12A shaped according to one embodiment of the present invention.

FIG. 13A is a cross-sectional view of a primitive object.

FIG. 13B is a cross-sectional view of the primitive object of 13B divided into two primitive objects according to one embodiment of the present invention.

DESCRIPTION OF THE PREFERRED EMBODIMENT

Figure 3:
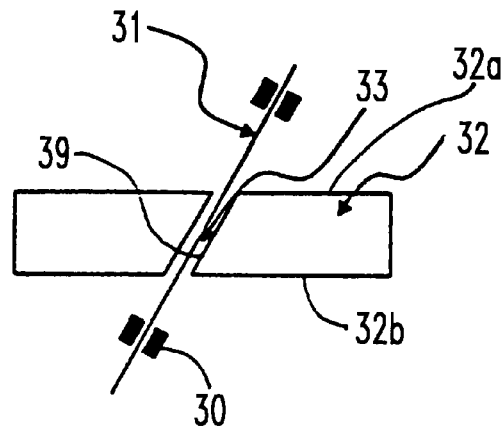
FIG. 3 is a diagrammatic side view of a formation stage of an object segment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates.

One embodiment of the present invention includes a methodology to fabricate features, especially small features. The procedure starts by making a 3D CAD model of a feature. When a model is defined, it is decomposed into simple shaped layer models. Distinguished from other methods, the simpler layer model has a 3D feature. The thickness of each layer is also varied to optimize the accuracy, precision, and strength of parts and machining time and convenience of machining of each layer. For direct fabrication of a mold insert instead of parts, the outline of each layer and the groove or joining feature for further alignment of the stack location is predefined at this stage. After optimizing the segmentation of each layer, the geometric data of each layer is converted into the data type for a wire electrodischarge machine (EDM), laser, or other appropriate fabrication technique. After setting the machining tool, the converted geometric data is transferred. Before machining begins, a designated thickness layer is fed into the machining tool automatically or manually. The tool, which has at least 4-axis freedom of machining, starts machining. After finish machining, each layer is stacked in a guide. When the sheet metal material is used to make the mold insert, the machined layers can be stacked in a predefined groove or other joining feature. Alternatively, machined layers can be aligned using predetermined locating features. When making a mold insert, the stacked and aligned layers are fixed in a mold machine cavity to be used as a mold insert. The layers can also be bonded together. The bonding technique can be by use of a thermoset adhesive film, a photopolymer with a cure initiated from the edge, or such other technique as would occur to those skilled in the art.

FIG. 1 is a diagrammatic side view relating to the formation of object 42 at the bottom portion of the view by stacking a number of differently sized layers 41 that are shown separately in a top portion of the view. The layer formation technique for object 42 results in a stepped outer surface contour 43 that often poorly emulates curved shapes. Unfortunately, existing schemes are typically constrained to shaping individual layers generally perpendicular to the stacking planes 44 where layers 41 meet each other, resulting in the "stair-case" shaping of contour 43.

FIGS. 2A and 2B are a diagrammatic view of another object 72 formed from multiple layers 71. In this case, the desired curved outer surface contour is represented by a dashed line 79. It should be understood that the stair-step approximation of a curved outer surface cannot be avoided in this type of method. Accordingly, a stair-stepped approximation of the desired contour 79 provided by object 72 is illustrated in solid line form as actual contour 73. Reference number 74 indicates the face direction of object 72. Reference numeral 75 indicates the face direction of a corresponding mold cavity. It should be appreciated that the directions represented by reference numerals 74, 75 can be reversed.

FIG. 3 diagrammatically illustrates a side view of a material removal stage to shape layer 32 with the cutting wire 31 of an Electric Discharge Machining (EDM) machine 30 (schematically shown). Unlike layers 41 or 71, layer 32 is formed with an oblique angle relative to its opposed stacking surfaces 32a and 32b. Alternatively, in some embodiments, a laser may be used to provide this oblique angle shaping at terminal end 39 of layer 32.

Figure 4:
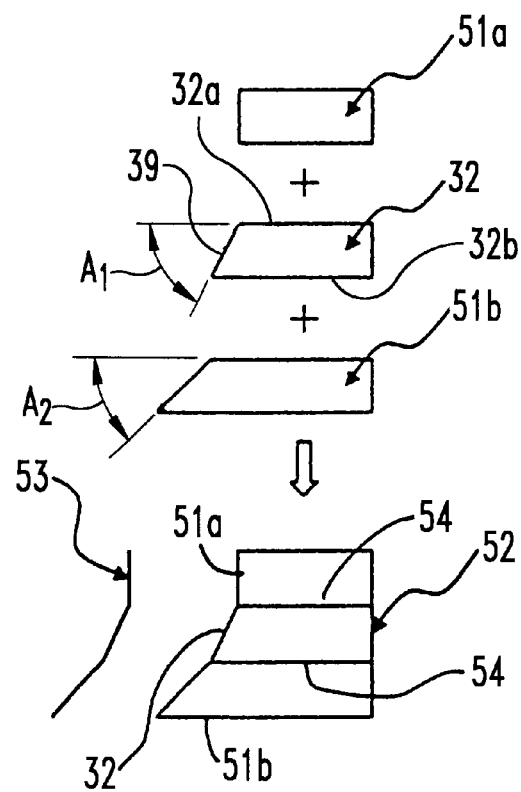
FIG. 4 is a diagrammatic side view of an object formed from multiple segments, including the segment of FIG. 3.

Referring additionally to FIG. 4, oblique angle A1 of layer 32 is shown after the material removal stage illustrated in FIG. 3. Furthermore, FIG. 4 schematically depicts the stacking relationship of layers 32, 51a, 51b to form object 52. The top portion of the FIG. 4 separately shows layers 32, 51, 51b in an exploded view and the bottom portion of the FIG. 4 shows layers 32, 51a, 51b engaged in a stacked relationship. Layer 51b is also formed with an obliquely angled outer surface corresponding to angle A2 relative to stacking planes 54, which is different than angle A1. An EDM machine or laser is used to shape layer 51b with angle A2. Notably, when assembled together, layers 32, 51a, 51b provide outer surface contour 53 of object 52 as schematically shown.

It should be understood that by adjusting the angle of the outer surface from one layer to the next, a closer approximation to a curved outer surface may be obtained. Alternatively or additionally when a portion of the desired outer contour of an object changes less relative to other portions, then a thicker layer or segment can be used to represent the portion with a lesser degree of outer contour change. By selecting layer thicknesses in this manner, the number of layers can be reduced without sacrificing accuracy or smoothness of the resulting outer surface of the object.

Figure 5:
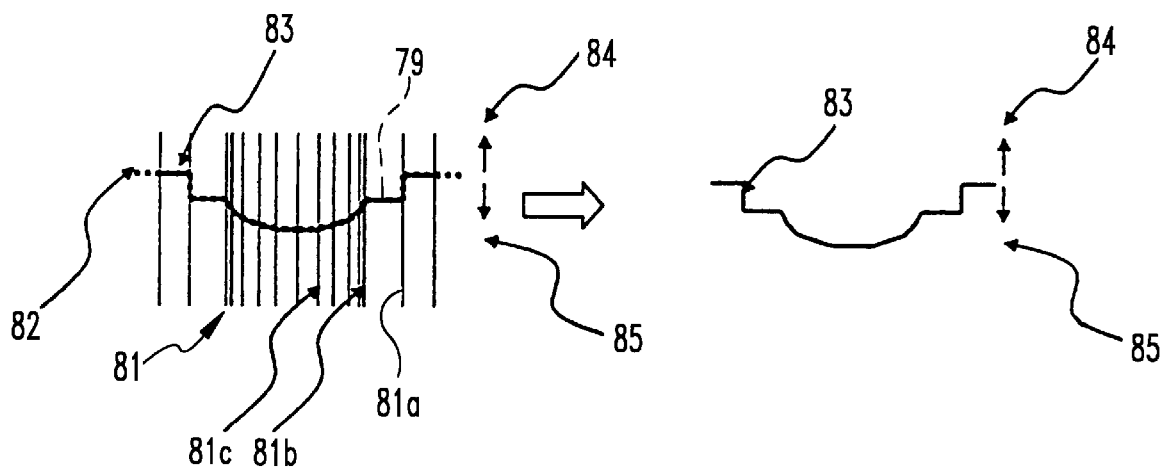
FIG. 5 is a diagrammatic side view of another object and the resulting surface contour.

FIG. 5 illustrates an object 82 formed from layers of various thickness and outer surface angles selected to provide a better approximation of the desired object shape. These layers are generally designated by reference numeral 81 and a few particular layer/segments are designated by reference numerals 81a, 81b, 81c. The desired target shape of object 82 is represented by desired contour 79, the same as for object 72 of FIG. 2. By comparing FIGS. 2 and 5, it may be noted that actual outer surface contour 83 of object 82 is a closer approximation to contour 79 than actual contour 73 of object 72. Reference number 84 indicates the face direction of object 82. Reference numeral 85 indicates the face direction of a corresponding mold cavity. It should be appreciated that the directions represented by reference numerals 84, 85 can be reversed. Notably, contour surface change of segment 81a is less compared to segment 81b. Correspondingly, segment 81a has a greater thickness than segment 81b.

Figure 6:
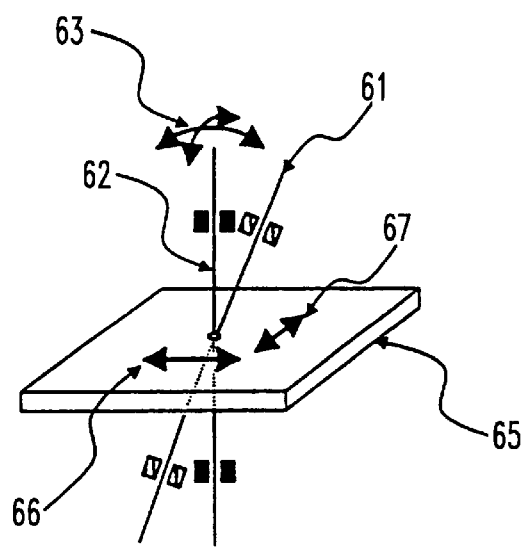
FIG. 6 is a schematic perspective view of a cutting machine having multiple angular degrees of freedom to fabricate segments for the objects of FIGS. 4 and 5.

FIG. 6 is a schematic perspective view illustrating the degrees of freedom of machine 65 for providing adjustable outer surface contour angles of various pieces of objects 52, 82. Reference numerals 61, 62 of FIG. 6 represent two different nonlimiting examples of cutting line angles of a wire EDM or LASER. Double-headed arrow 66 represents a degree of freedom in the X direction while cutting material with machine 65. Double-headed arrow 67 represents a degree of freedom in the Y direction while cutting material with machine 65. Reference numeral 63 depicts the U-V taper angle directions of machine 65 while cutting. Correspondingly, the EDM machine or LASER can have 4 degrees of freedom.

By using tapered outer angles and different layer thickness, a smoother and more continuous outer surface can be produced. Typically, the layers or segments of the present invention are composed of a metallic material. This material is initially provided in a sheet form that is shaped by cutting and/or material removal with an EDM machine or laser embodiments of which are represented in FIG. 6. Nonetheless, in other embodiments, a different material or multiple material types may be used.

Figure 7:
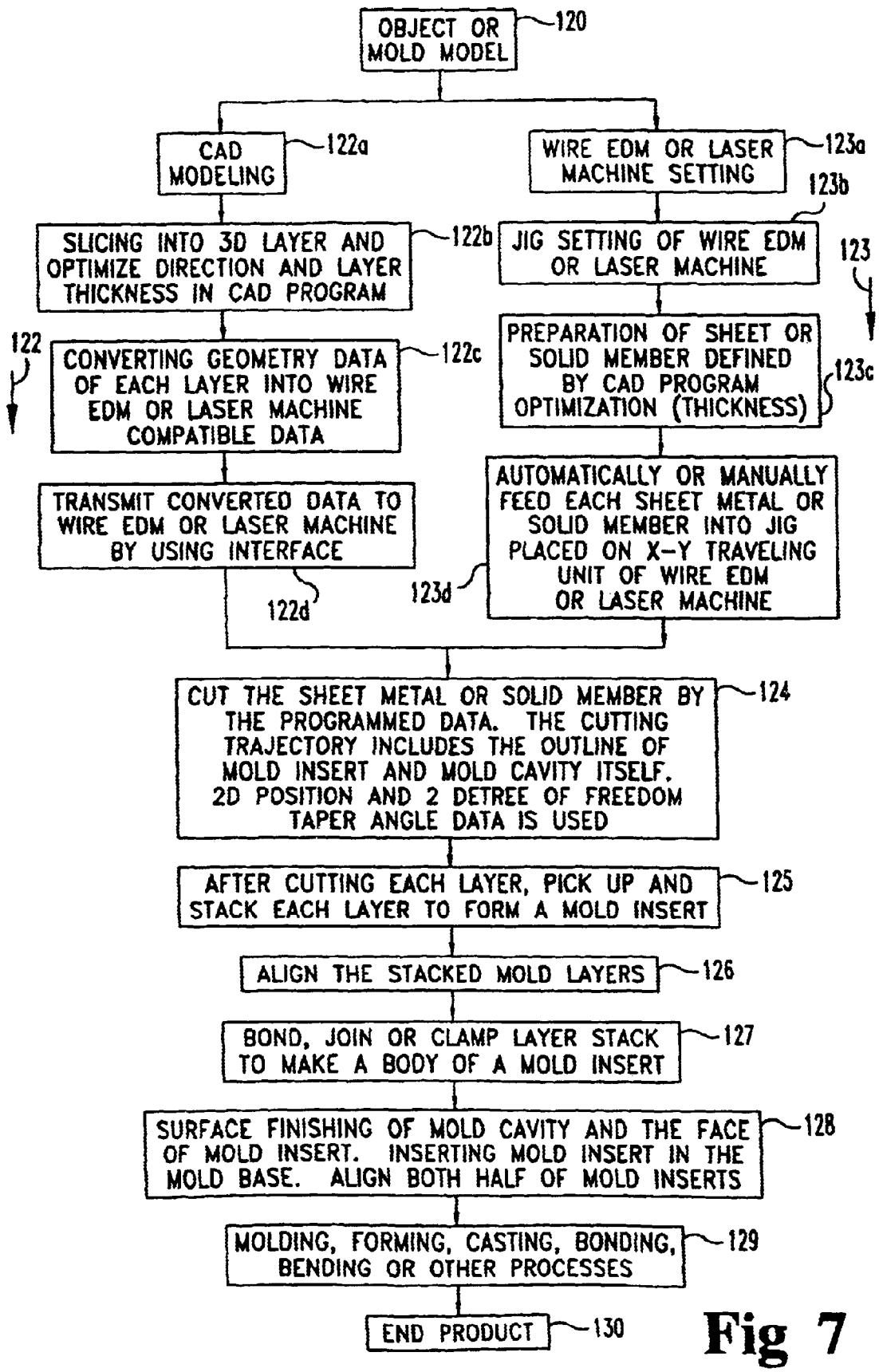
FIG. 7 is a flow chart of a multi-segment object fabrication process.

FIG. 7 shows a flow chart of a multi-layer object fabrication process according to the present invention. In stage 120, a desired part of mold is provided. The process then proceeds along two parallel branches 122, 123. In branch 122, computer-aided design (CAD) processing of the part or mold is performed starting with modeling in stage 122a. Branch 122 continues with 3D segmentation and thickness optimization in stage 122b, converting CAD geometry data into a data format compatible with the layer shaping machine (such as machine 65) in stage 122c (if needed), and transmitting this data to the machine in stage 122d. For branch 123, the EDM or laser machine settings are performed in stage 123a, jig setting is performed in stage 123b, material is prepared in stage 123c, and the material is fed to the machine in stage 123d. It should be appreciated that in other embodiments, one or more stages of branch 123 can occur before or after one or more stages of branch 22 as would occur to those skilled in the art.

Branches 122 and 123 rejoin at stage 124 where each layer of material is cut or shaped. In stage 125 the layers are stacked after shaping from stage 124. The stacked layers are aligned in stage 126. In stage 127, the body of one or more mold inserts (or other desired object(s)) is formed from the stack by bonding, joining or clamping. In one embodiment, metal layers for a mold insert are engaged to one another by placement in one or more complimentary grooves. Alternatively or additionally, the layers can be bonded together to reinforce the attachment between layers. The bonding technique can include using thermoset adhesive films that can also be cut using a programmed cutter knife with the 3D description data from the CAD system. In another approach, a photopolymer may also be used and the cure initiated from the edge.

In stage 128, surface finishing is performed. In stage 129, the part(s) or tooling provided by stages 120–128 are applied to make products by molding, forming, casting, bonding, bending, or other techniques as would occur to those skilled in the art. The process terminates with production of this end product as represented by stage 130.

FIGS. 8A, 8B, 8C, 8D, and 8E schematically illustrate the fabrication of mold 222 for part or object 220 in accordance with the process of FIG. 7. Mold 222 includes two mold portions 222a and 222b. Two alternate segmentations 224a, 224b are illustrated for mold portion 222a; however, only segmentation 224a is ultimately utilized in this example. Segmentation 226 is illustrated for mold portion 222b. Segmentations 224a, 224b, 226 are performed with a CAD model as described in connection with FIG. 7.

It should be appreciated that segmentation 226 is performed so that rib segments 227 are each made in one piece to improve strength and reduce processing time. An EDM or laser machine is utilized to shape material to provide physical segments a few of which are designated by reference numeral 228. The segments 228 are then engaged to each other to provide assembled mold inserts 232a, 232b corresponding to mold portions 222a, 222b, and segmentations 224a, 226, respectively.

Mold inserts 232a, 232b are inserted in corresponding recesses 242a, 242b of molding machine 240. Recesses 242a, 242b are formed in dies 244a, 244b of molding machine 240. Die 244a is configured to move towards die 244b along guide posts 246 to mold an end product, part 220 as schematically shown in FIG. 8.

Many forms of the present invention are envisioned. For example, in one form, the present invention includes a unique technique to fabricate an object from multiple segments. Other forms include unique systems and methods of rapid prototyping of a part or corresponding tooling.

A further form of the present invention includes a technique to fabricate an object from several segments, comprising removing material from one or more of the segments with an EDM machine.

In another form of the present invention, a technique to fabricate an object from several layers includes removing material from one or more of the layers to provide an outer surface at an oblique angle relative to another surface of the one or more layers. The layers can have a metallic composition.

In yet another form of the present invention, a technique to fabricate an object from a number of stacked pieces includes selecting different thicknesses of the pieces based on a degree of change in a surface contour of the object.

In still another form of the present invention, a preferred technique to fabricate micromachines with a maximum feature dimension of less than about 5 millimeters includes forming the machine from a number of stacked pieces and shaping one or more of the pieces with an EDM machine or laser. In a more preferred form, the maximum feature dimension is less than about 1 millimeter, and in an even more preferred form, the maximum feature dimension is less than about one-half of a millimeter.

For another form of the present invention, an EDM machine is used to shape two or more segments with different outer contour angles corresponding to a desired contour of an object comprised of the segments. Alternatively or additionally, the thickness of the segments comprising the object can be selected in accordance with changes in this contour.

A further form of the present invention comprises: generating a model of an object with a computer-aided design program; segmenting the model into a number of segments with the program; forming a number of pieces each corresponding to one of the segments, said forming including shaping one or more of the pieces with an obliquely angled surface with an EDM machine; and connecting the pieces together to provide the object. Additionally, this form may include transmitting the data for one or more of the segments from a computer executing the program to the EDM machine and/or selecting thickness of one or more of the pieces based on a degree of change in the surface contour of such one or more pieces.

In yet a further form, by stacking and aligning the machined layers, an end product, a die for sheet metal bending or a mold insert for casting or injection molding can be produced. Alternatively or additionally, sensors or actuators can be fabricated within the layers to perform special functions. In addition multi-materials may also be used in the layering scheme.

In still a further form, fine wire EDM is used to fabricate micro parts or molds. Parts and molds that can be fabricated under this form can have shapes with a greater degree of 3D shaping than is possible with silicon-based schemes. Preferably, the parts or molds have feature dimensions in a range between about 25 micrometers and 5 millimeters. More preferably, this range is about 25 micrometers to about 1 millimeter. Even more preferably, this range is about 25 micrometers to about 0.5 millimeter.

A further form includes a laser to fabricate micro parts or molds. Parts and molds that can be fabricated under this form can have shapes with a greater degree of 3D shaping than is possible with silicon-based schemes. Preferably, the parts or molds have feature dimensions in a range between about 5 micrometers and 5 millimeters. More preferably, this range is about 5 micrometers to about 1 millimeter. Even more preferably, this range is about 5 micrometers to about 0.5 millimeter.

Another form of the present invention provides rapid prototyping of an object by decomposing a computer-generated 3D model of the object into 3D portions that are communicated to an EDM or laser machine. A number of pieces are formed with this machine in correspondence with data for these portions. The pieces can be stacked or otherwise engage one another to provide the object. The pieces can be composed of metal to be directly configured for use as a mold insert. In addition, sensors or local heat sources can be embedded within the pieces to do special functions. Furthermore, by selectively changing the thickness, the precision of resulting objects can be improved, and continuous fabrication is made possible by using wire spool EDM or Laser because the shaping/cutting machine does not have to be reconfigured for each work piece.

Figure 20:
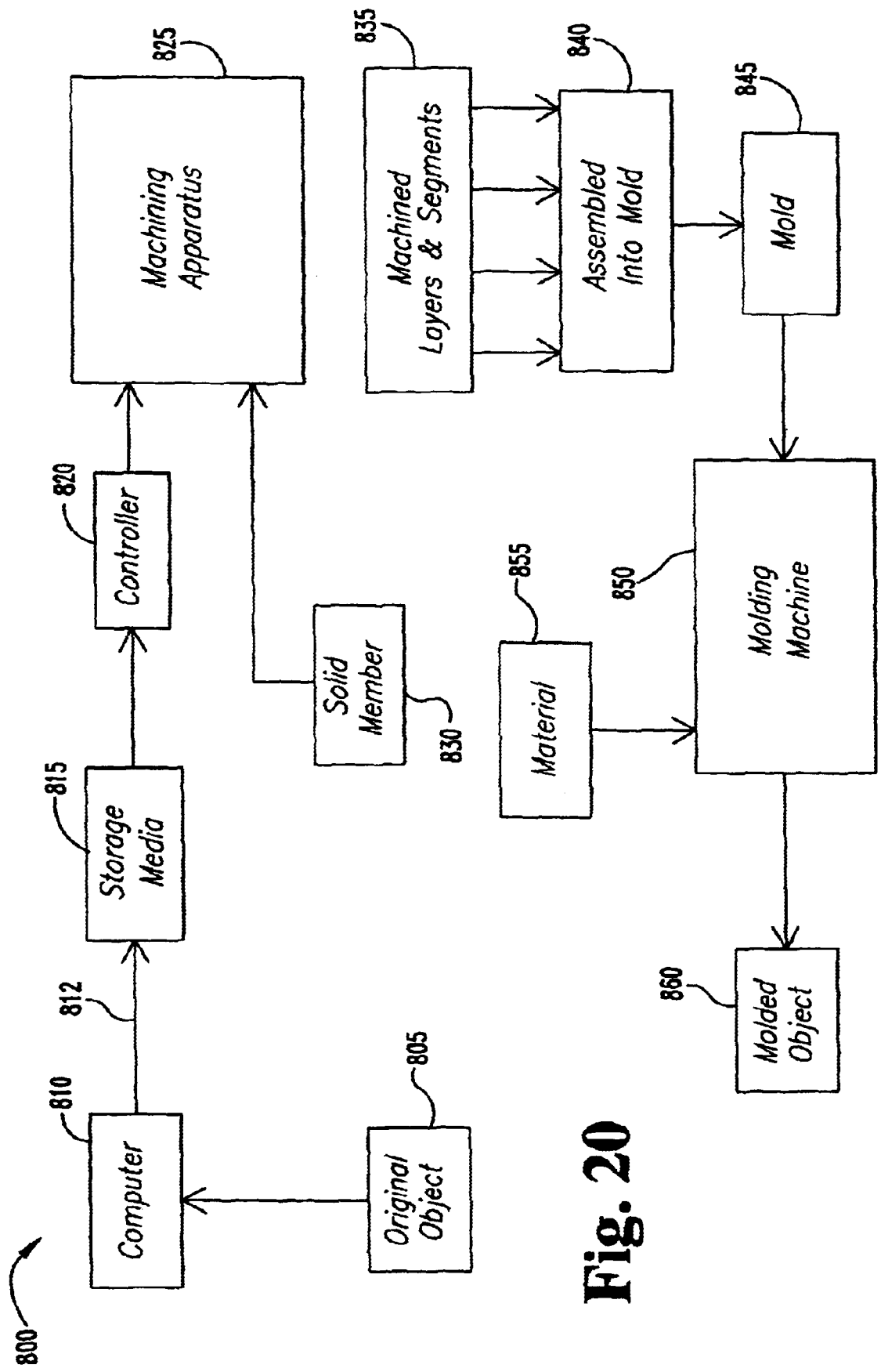
FIG. 20 is a block diagram of method and apparatus for molding an object according to one embodiment of the present invention.

Another embodiment of the present invention is depicted in block diagram 800 of FIG. 20. Process 800 begins with the selection 805 of an original object, a molded likeness of which is to be produced. This object may be of any type which can be molded. However, the present invention also contemplates those embodiments in which the result is not a molded object, but is an object comprised of a plurality of layers, segments, and primitive objects.

In one embodiment, a user prepares a computer model 807 of the surfaces of the original object preferably using three-dimensional computer-aided design (CAD) software 809 on a computer or similar processor 810. In some embodiments, computer model 807 is transferred as a signal 812 encoded with instructions that are stored on storage devices 815. Storage media 815 may be of any type, including a floppy disk, hard drive, CD, RAM, magnetic tape, or the like.

When it is desired to produce a mold comprised of the layers, segments and primitive objects previously determined, signal 812 encoded with instructions is input into a controller 820 for a machining apparatus 825. Preferably, machining apparatus 825 is a wire EDM apparatus, laser machining apparatus, or related machining apparatus that is efficient at shaping solid members with linear sloping surfaces. A plurality of solid members 830 of varying thicknesses corresponding to the thicknesses of the various layers, segments, and primitive objects are located and set-up on machining apparatus 825. Machining apparatus 825 produces a plurality of shaped solid members 835 corresponding to the layers, segments, and primitive objects previously established with model 807. These solid members 835 are subsequently assembled as shown by block 840 into one or more portions of a mold 845. The mold portions 845 are placed on a molding machine 850. In a manner well-known in art, molding material 855 is located within mold 845, exposed to a process of controlled time, temperature, and pressure by machine 850, resulting in the production of a molded object 860, which corresponds to the original object 805.

Figure 9:
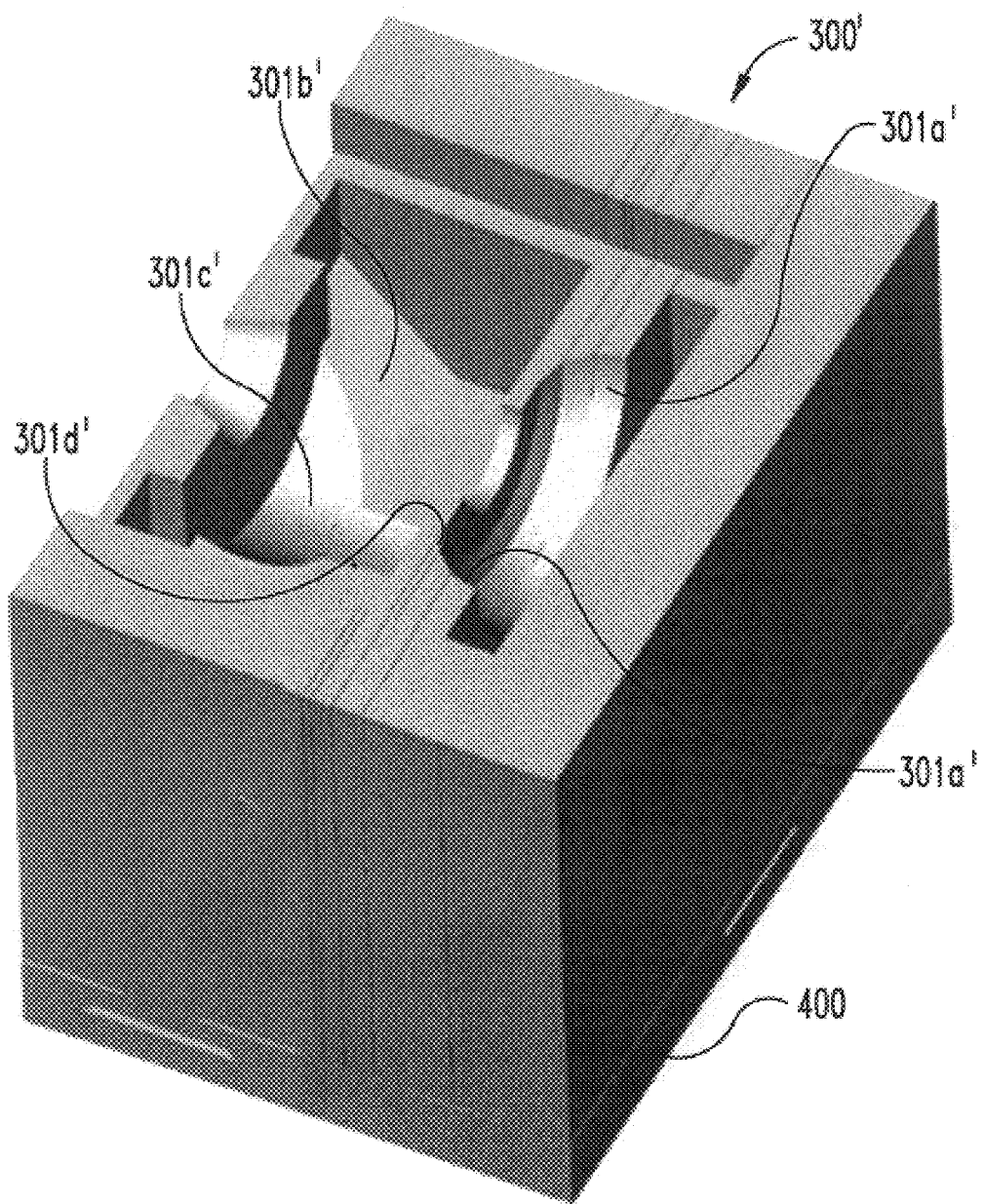
FIG. 9 is a perspective side view of a mold according to one embodiment of the present invention.
Figure 10:
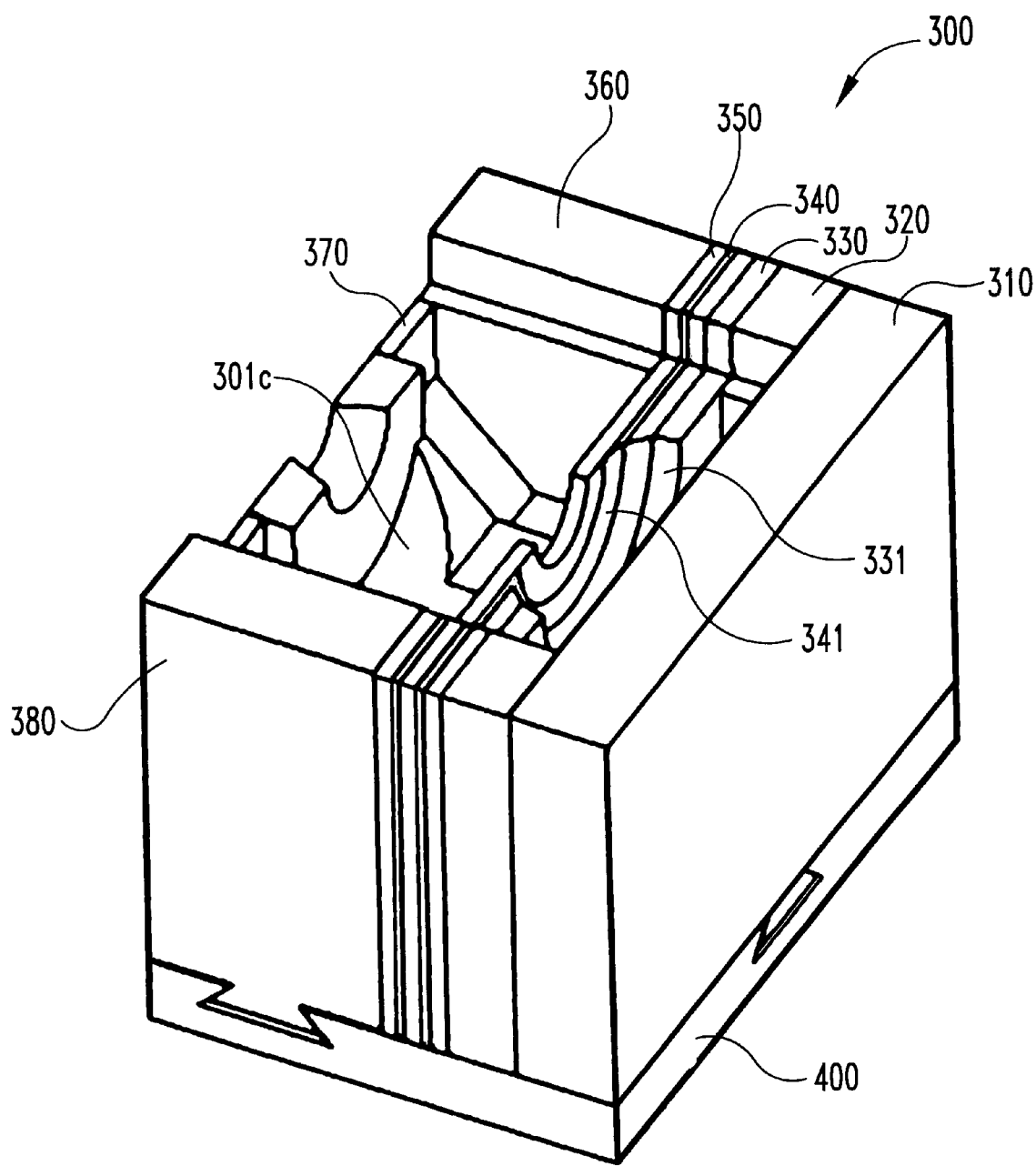
FIG. 10 is a perspective view of the mold of FIG. 9 decomposed into sectioned layers.

Another embodiment of the present invention is shown in FIGS. 9, 10, 11, and 12. As best seen in FIGS. 9 and 10, one embodiment of the present invention includes a mold 300' for making an object. Although what will be shown and described is a method for making a mold, it is understood that the present invention contemplates the fabrication of objects other than molds.

Mold 300' includes a plurality of inner surfaces 301*a'*, 301*b'*, 301*c'* and 301*d'*, which correspond to surfaces of the object to be molded. In a preferred embodiment, the object to be molded is modeled with a computer using software that permits preparation of a computer database that corresponds to a three-dimensional representation of the object. However, it is understood that it is not necessary to use a computer to prepare the model, and that the model can be any of a variety of other forms, including one or more two-dimensional drawings, and even a physical model.

Referring to FIG. 9, the surfaces of the object are represented in unsectioneed and complementary manner within mold 300'. For example, a convex surface of the object is represented as a concave surface 301c' in mold 300'. As another example, a diameter on the surface of the object is represented as a diameter 301a' in the mold.

Figure 11:
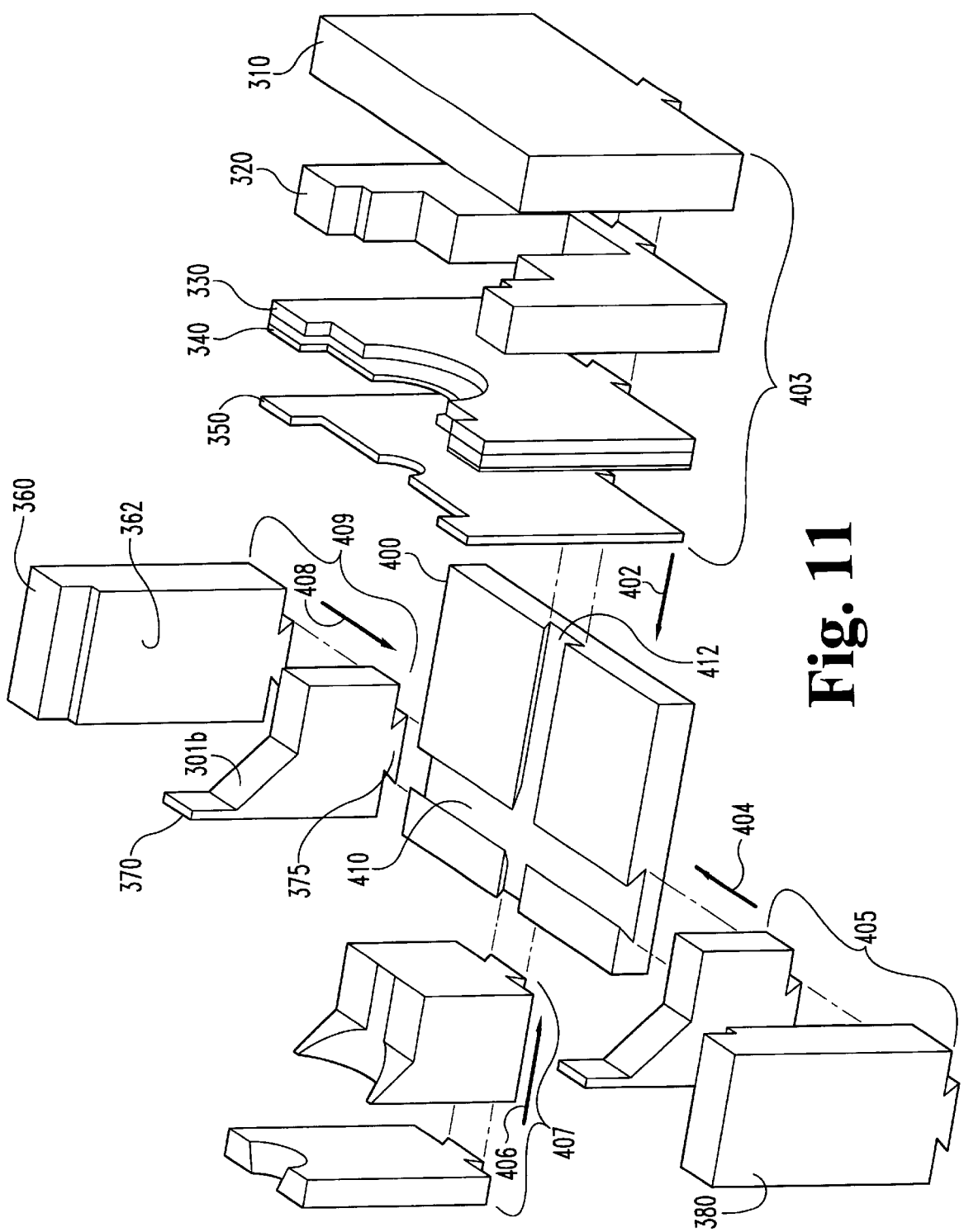
FIG. 11 is an exploded, perspective view of the mold of FIG. 10 disassembled.

According to one embodiment of the present invention, mold 300' of FIG. 9 can be converted or decomposed into a mold assembly 300 comprised of multiple layers, segments, primitive objects, and other features, as best seen in FIGS. 10 and 11. Mold assembly 300 includes layers 310, 320, 330, 340, 350, 360, 370, and 380, as well as other layers, segments, and primitives. Layers according to the present invention are made by dividing the mold 300' into a plurality of layers of different thicknesses. Preferably, the layers are divided and have thicknesses based on the curvature of the object and the corresponding curvature of the mold complementary shape. The present invention permits a more accurate representation of the object by the use of relatively thin layers for portions of the model with sharply curving edges, and thicker layers for portions of the model with edges having less curvature or no curvature. Referring to FIGS. 9 and 10, layer 340 is relatively thin based on the relatively sharp curvature of surface 301d'. Likewise, layer 330 is much thicker because of the reduced curvature seen along surface 301a'. By selecting the layer thickness based on the curvature of the object being molded, the overall number of layers of the model can be greatly reduced with commensurate savings in machining time and expense.

As discussed previously, the present invention further contemplates the use of sloping linear edges to correspond to curving edges of the object. Comparing FIGS. 9 and 10, the curvature of the object corresponding to mold surface 301d is represented by a conical surface 341 with a linear edge. Therefore, the item produced by the mold can be closer in shape to the object when desired, as compared to known methods which use edges that are perpendicular to the planar surfaces of the layer. On preferred embodiment of the present invention includes sloping linear edges that are oblique to the flat planar surfaces of the layer.

A linear sloping edge such as that shown for surface 341 in FIG. 10 and for layer 51b of FIG. 4, can be machined using a wire electrodischarge machine (EDM), a laser, or similar process. Both the electrified cutting wire in the EDM process and the laser can quickly produce linear edge surfaces. Linear edges of the type contemplated by the present invention generate ruled surfaces, which are well-known mathematical surfaces. Examples of ruled surfaces can be found in International Journal of Machine Tool Manufacturers, "An Algorithm for Surface Design and Tool Path Generation in Wire-cut Electrical Discharge Machining", Yan et al, vol. 35, no. 12, published 1995, and incorporated herein by reference.

Figure 21A:
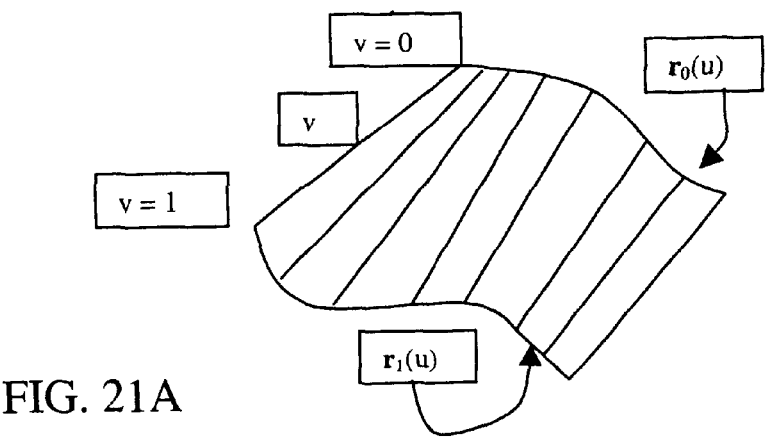
FIG. 21A is a depiction of a mathematical object.
Figure 21B:
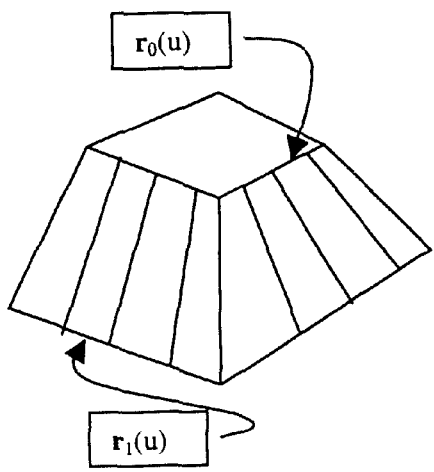
FIG. 21B is a depiction of a mathematical object.
Figure 21C:
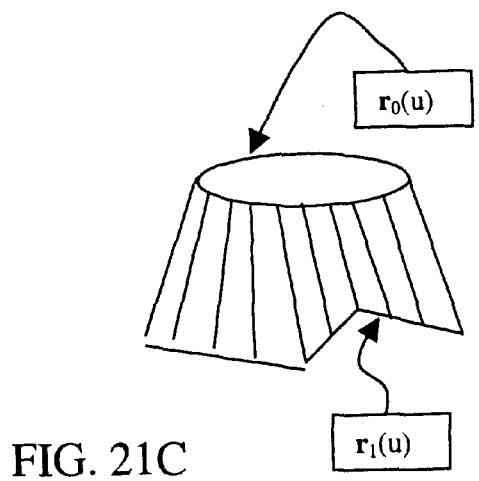
FIG. 21C is a depiction of a mathematical object.

In some wire-cut electric discharge machining operations, the cutting wire electrode is guided by upper and lower guides. The upper guide and the machining apparatus table move parallel to each other. The resulting surface provided by the EDM machining operation is a ruled surface. The wire-cut EDM operation interpolates between a 2-D upper shape and 2-D lower shape to determine the surface. The ruled surface which is generated by a family of straight lines can be described based on rulings joining corresponding points on two space curves r=r0(u) and r=r1(u) (referring to FIGS. 21 A, 21B, and 21C) is given by:

$$R(u, v) = (1-v) + v\, r_1(u)$$

One of the curves can be a polynomial and the other can be a polygon. The restrictions on the two curves $r_0(u)$ and $r_1(u)$ are minimal.

As long as the definition of the interpolation between the two curves is maintained, the control points of the curves or the vertices of the straight lines forming the curves can be moved. The resulting primitive is still shapeable by processes such as wire EDM, laser, and similar machining methods. In addition if a particular primitive is shapeable by these processes, then a linear cut operation on the primitive with one of these processes results in a primitive that includes ruled surfaces. The dovetail 375 depicted herein results from two EDM operations. The primitives can be modified during creation of the model 807 to further create primitives with ruled surfaces, since the mathematical history creation of the primitive continues to be maintained.

In one embodiment according to the present invention, all surfaces and all features of any layer or segment are ruled surfaces. By incorporating ruled surfaces on all sides of the individual layers and segment of mold 300', those layers and segments can be fabricated with exclusively wire EDM or laser machining techniques when desired. The use of a single machining techniques permits a reduction in processing time and costs for the rapid prototyping method. However, the present invention also contemplates those embodiments in which only a portion of the surfaces of a layer, segment, or primitive object are ruled surfaces. For example, in some embodiments only those surfaces of the layer, segment, or primitive object that correspond to surfaces of the object to be molded are converted to ruled surfaces. This embodiment contemplates use of a wire EDM, Laser, or similar process to efficiently produce these selected surface portions, with other aspects of the layer, segment, or primitive object being machined or formed by other processes.

Referring to FIGS. 10 and 11, some embodiments of the present invention include the placement of thin layers between thicker layers. For example, thin layer 340 is located between thicker layers 330 and 350. Further, layers 330, 340, and 350 are placed between thicker layers 320 and 360. This nesting of thinner layers between thicker layers improves the molding process by reducing damage to the thinner layers during removal of the cast object. It has been found that seepage of the molten or liquid casting material on either side of a thin layer causes damage to that thin layer when the cast object is removed. When desired, this problem can be overcome by nesting the thinner layer between thicker layers so that any defection of the thinner layer by the cast material is reduced or prevented by the rigidity imparted by nearby thicker layers. However, in other embodiments, it should be appreciated that this arrangement may not be necessary or desired.

FIG. 11 shows an exploded view of a mold 300. In some portions of this document, the three hundred series numbers (3XX) refer to either the computer representation of a layer, segment, or primitive object or the shaped solid member corresponding to the same layer, segment, or primitive object. According to one embodiment of the present invention, the layers and segments can be assembled into a mold from multiple directions. FIG. 11 shows a first group 403 including layers 310, 320, 330, 340, and 350 which are assembled onto a joining plate 400 along a first direction 402. A second group 409 including layers 360 and 370 assembled onto joining plate 400 in a second direction 408 that is different with direction 402. A third group 407 is assembled onto joining plate 400 in a third direction 406 that is generally opposite with direction 402. A fourth group of layers including layer 380 are assembled onto joining plate 400 along a fourth direction 404 that is generally opposite with second direction 408.

According to one embodiment of the present invention, the various layers of mold 300 are assembled onto a common joining plate 400. Joining plate 400 includes a pair of joining features 410 and 412 which extend across plate 400. Joining features 410 and 412 may be of any type, and are shown as female dovetail groves. Joining feature 410 and 412 are preferably oriented relative to each other by an oblique angle. Preferably, each of the layers and segments of mold 300' include a joining feature that is complementary to the joining feature of the joining plate 400. As one example, layer 370 includes a male dovetail joint 375 that is slidingly accepted within joining feature 410. The present invention contemplates joining features other than dovetail joints, including for example bolts, adhesives, dowel rods and holes, square joints fitting in square grooves.

After a model of the various layers and segments of mold 300 has been generated, solid members are shaped or machined into shapes that correspond to the shapes of the layers. Referring to FIG. 12, a solid member 370" is shown. In one embodiment, sold member 370' is a flat plate of substantially constant thickness having parallel coplanar surfaces 372" and 374". In a preferred embodiment, the representation of the shape of layer 370 is used in the control of a computer numerically controlled (CNC) wire EDM 825 or laser apparatus to shape solid member 370" into a shape corresponding to the shape of the corresponding layer. Mold member 370 includes a linear sloping edge 376 which corresponds to surface 301b' (see FIG. 9). Surfaces 372, 373, and 374 are preferably flat surfaces that abut an adjoining layer. For example, flat planar abutting surface 374 of layer 370 abuts an adjoining surface 362 of layer 360 (see FIG. 11). Shaped member 370 includes joining feature 375 which is preferably a joining feature common to the other layers. In one embodiment of the present invention, all surfaces of shaped member 370 are ruled surfaces, such that all machining can be performed with a wire EDM or laser process. However, the present invention also contemplates those embodiments in which one or more surfaces of shaped member 370 have not been shaped by a wire EDM or laser process.

Figure 18A:
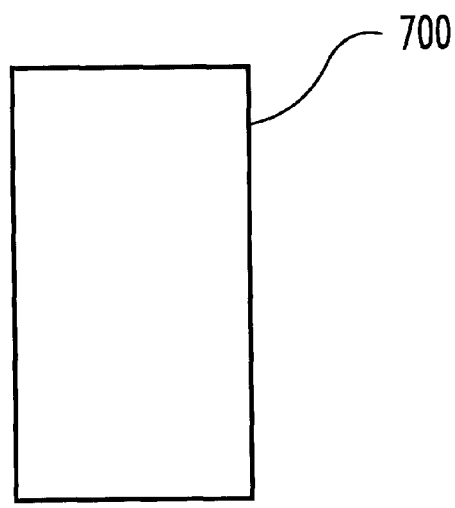
FIG. 18A is a frontal plane view of a solid member.

FIGS. 18A, 18B, 18C, and 18D depict the progression of a solid member into a primitive object with ruled surfaces after two machining setups. FIG. 18A depicts the raw material from which the primitive object is to be shaped. If the shaping method to be used is a wire EDM process then solid member 700 is preferably comprised of a conductive material so that the current of the EDM process can be moved to electrical ground. In some embodiments of the present invention, the material comprising solid member 700 is electrically conductive and also a very hard material which by its hardness is suitable for many molding operation cycles. The hardness of the material has little, if any, effect on the EDM operation, provided that the material is electrically conductive, making a wire EDM method according to the present invention particularly suitable for fabrication of molds. However, it will be understood that this example and other examples in this document also encompass fabrication by laser, and any other machining method with multi-axis capability that efficiently machines a sloping linear edge.

Figure 18B:
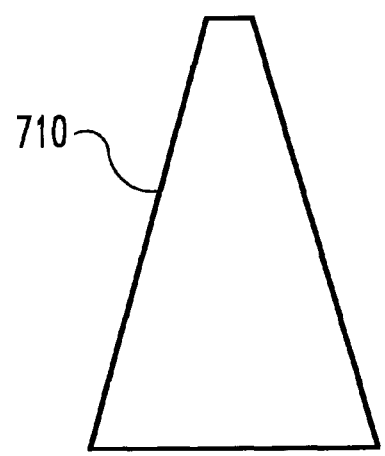
FIG. 18B is a frontal view of the solid member of FIG. 18A after being shaped according to one embodiment of the present invention.
Figure 18C:
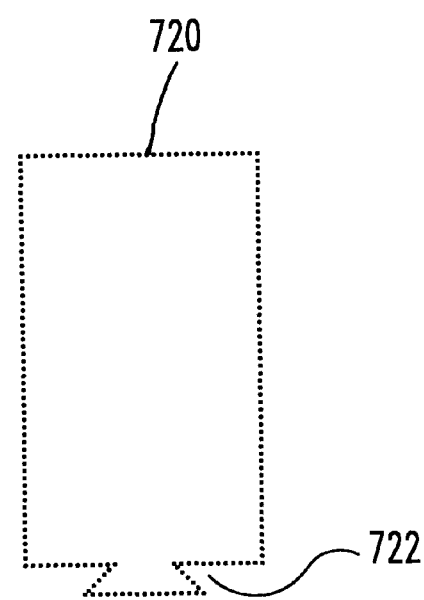
FIG. 18C is a side view of the member of FIG. 18B after being shaped according to one embodiment of the present invention in a direction orthogonal to the direction of shaping of FIG. 18B.
Figure 18D:
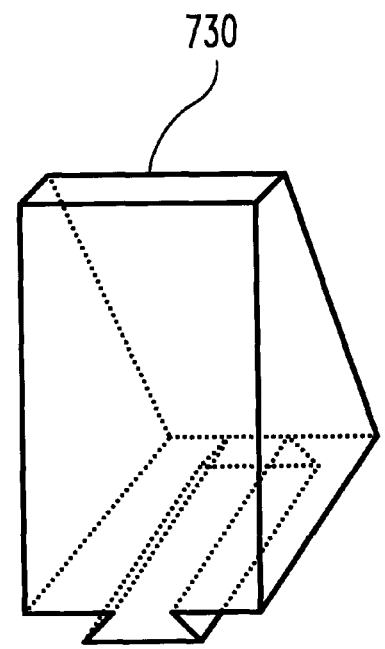
FIG. 18D is a perspective view of the object of FIG. 18C.

After solid member 700 has been placed in a first set-up on a wire EDM machine, the wire cuts a profile into solid member 700 which results in the planform of the partially shaped member 710 depicted in FIG. 18B. All wire-cut surfaces of FIG. 18B are linear edges and therefore ruled surfaces. Partially shaped member 710 is then released from the first set-up and placed on the wire EDM machine 825 in a second set-up. As depicted in FIG. 18C, the second set-up presents surfaces of solid member 710 for cutting that are roughly orthogonal to the surfaces previously cut. A second shape is cut into the partially shaped member 710 with the outline 720 as shown in FIG. 18C. Outline 720 includes a common, dovetail joining feature 722. After partially shaped member 710 has completed cutting according to the second set-up, a shaped member 730 as shown in FIG. 18D results. All surfaces of shaped member 730 are ruled surfaces.

Figure 19A:
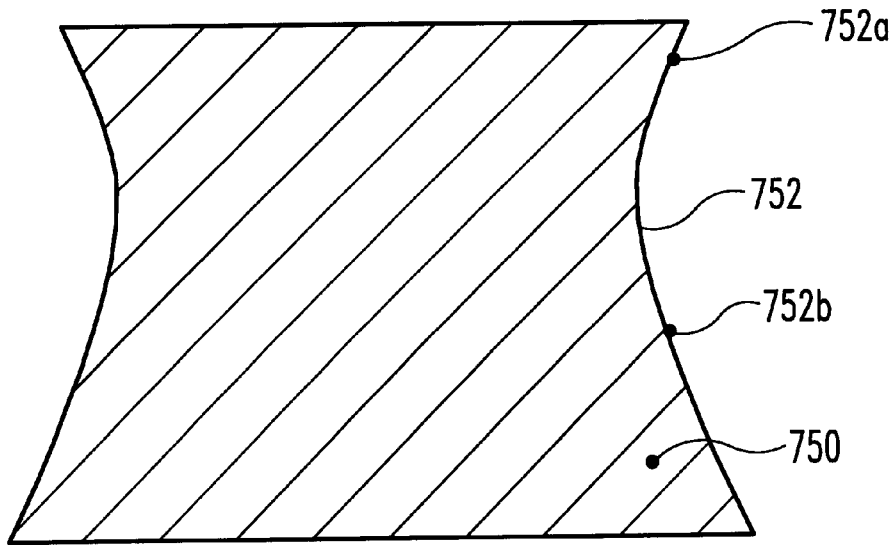
FIG. 19A is a side, cross-sectional view of a primitive object with concave surfaces.
Figure 19B:
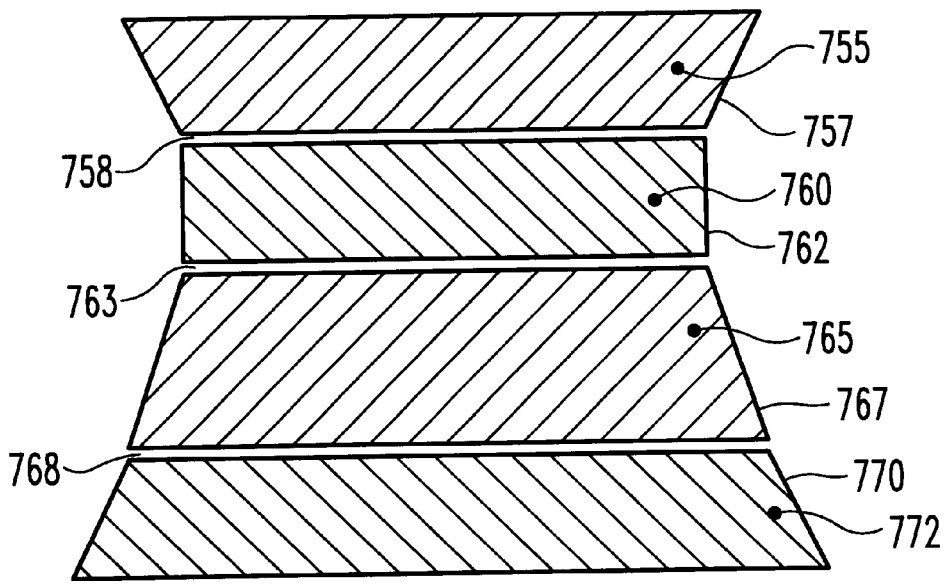
FIG. 19B is a cross-sectional view of the primitive object of FIG. 19A after being divided according to one embodiment of the present invention.

The decomposition of a single primitive into a pair of primitives that can be shaped by wire EDM or laser processes is shown in FIGS. 13A and 13B. FIG. 13A shows a cross section of a primitive 500 that is a solid of revolution. Primitive 500 includes linear sloping edges 501a, 501b, and 501c. It is difficult and time consuming to fabricate a solid corresponding to the shape of primitive 500 because of interior vertex 505 between surfaces 501b and 501c. Corner 505 is an interior corner such that the angle from surface 501b to 501c through the material of the primitive is greater than 180 degrees. However, by slicing primitive 500 into a pair of primitives 510 and 520 as shown in FIG. 13b, the interior corner 505 is removed, and the resulting included angle from newly formed surface 522 to surface 501c is measured going through the material of primitive 520 is less than 180 degrees FIGS. 19A and 19B depict the decomposition of a single primitive into a plurality of primitives with ruled surfaces. FIG. 19A depicts a cross-section of solid of revolution of a primitive object 750. Primitive object 750 includes a two-dimensional concave surface 752, which curves both in the plane of FIG. 19A and also curves as a solid of revolution. Two-dimensional concave surface 752 is difficult to shape with a wire EDM, laser, or similar straightedge machining method because of the two-dimensional curvature. Thus, fabrication of primitive object 750 may require the use of an alternative machining process.

However, primitive object 750 can be reduced or decomposed into a plurality of primitive objects which can be shaped using a wire EDM, laser, or similar linear edge machining method. According to one embodiment of the present invention, primitive object 750 is sliced or divided along planes 758, 763, and 768. Further, the curving edge 752 is remodeled and replaced with a plurality of linear edges. As can be seen in FIG. 19B, primitive object 750 is thereby decomposed into multiple primitive objects 755, 760, 765, and 770. Each of these for primitive objects includes a linear edge that represents a ruled surface. Primitive objects 755, 765, and 770 are depicted as truncated cones, whereas primitive object 760 is a cylinder.

In accordance with another embodiment of the present invention, the selection of layer thicknesses was made according to the curvature of the edge of the layer. For example, primitive object 755 represents a layer of primitive object 750 at a location where there is a first curvature 752a. Layer 765 was divided from primitive object 750 at a location where there is a second curvature 752b. Because the radius of curvature at location 752a is less than the radius of curvature at location 752b, layer 755 has a thickness which is less than the thickness of layer 765. As can be seen best in FIG. 19B, simple objects 755, 760, 765, and 770 include, in one embodiment of the present invention, flat, planar, opposing top and bottom surfaces.

Figure 14:
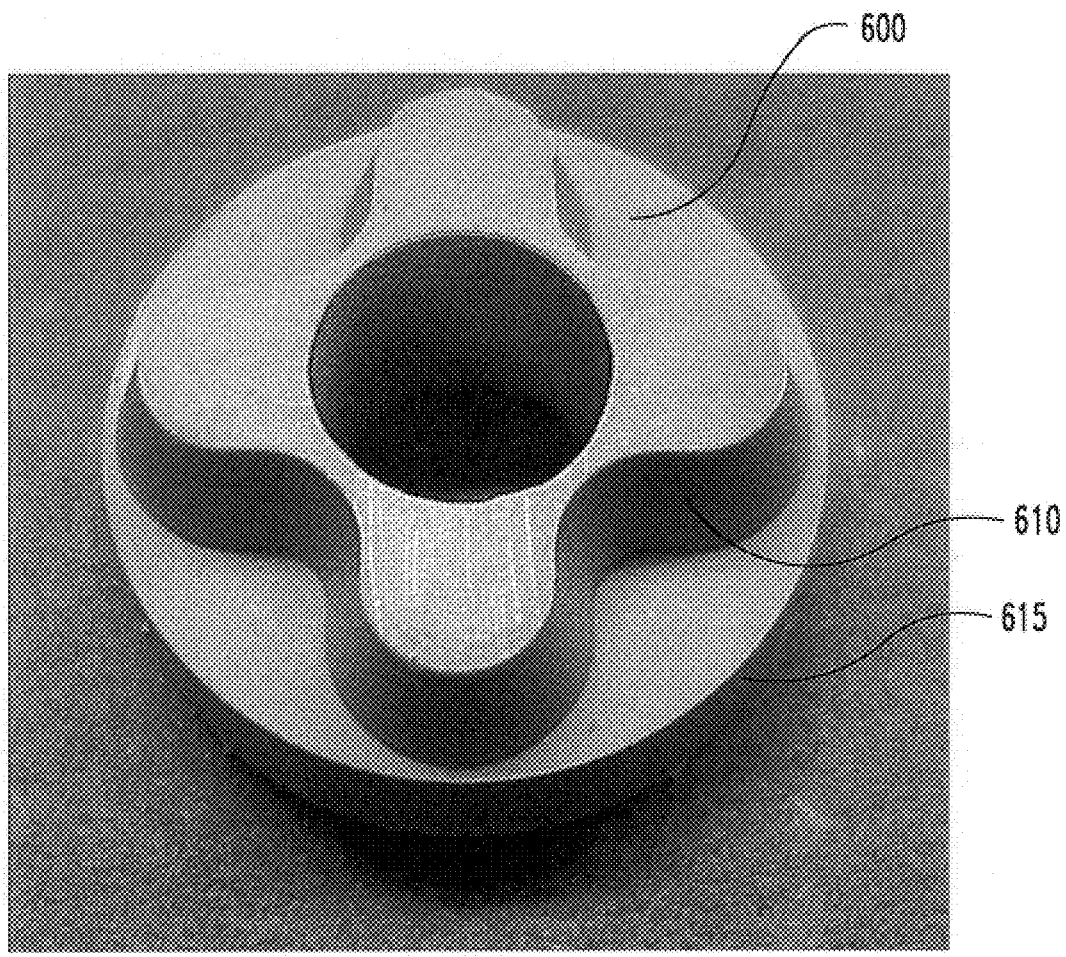
FIG. 14 is a computer-rendered image of an object to be molded.

FIGS. 14, 15, 16, and 17 depict a method for molding an object according to the embodiment of the present invention. FIG. 14 is a perspective view of an object 600 to be molded. Object 600 includes a curving surface 610, a surface curving in two-dimensions. Object 600 also includes a generally cylindrical surface 615. A computer model of a mold was generated having surfaces complementary to the surfaces of object 600. A mold for object 600 was prepared according to one embodiment of the present invention with a computer model. The computer model includes a plurality of thin layers with linear sloping edges to represent the shape of surface 610. A single thick layer represents the shape of surface 615.

Figure 15:
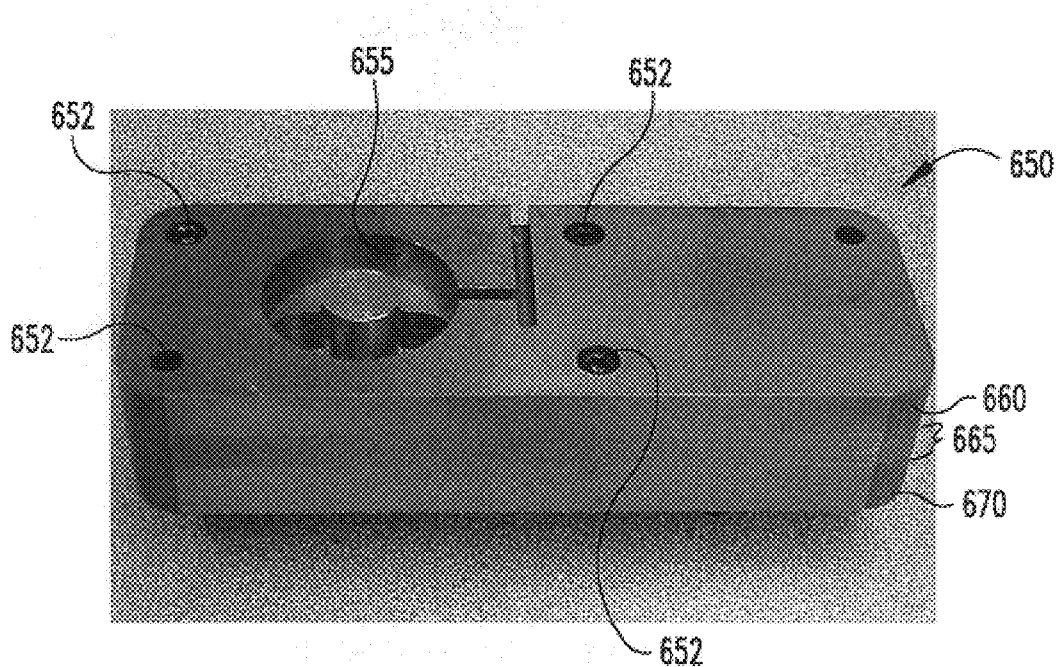
FIG. 15 is a computer-rendered image of a mold for making the object of FIG. 14 according to one embodiment of the present invention.
Figure 16:
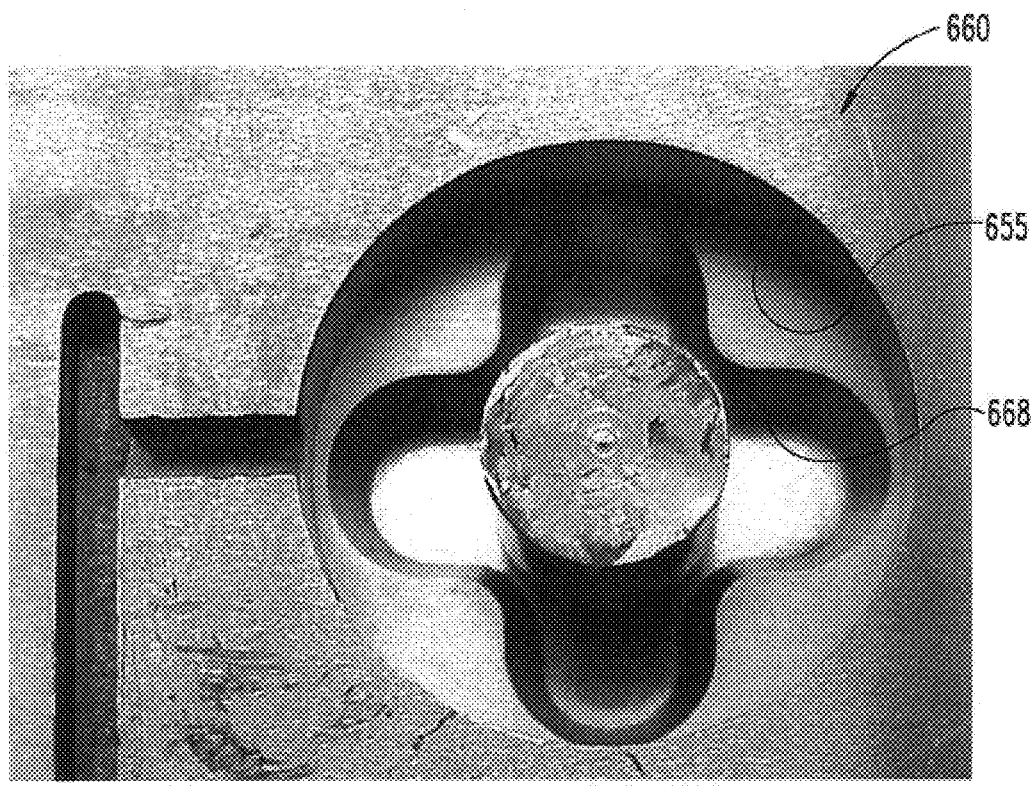
FIG. 16 is a computer-rendered image of a portion of the mold of FIG. 15.
Figure 17:
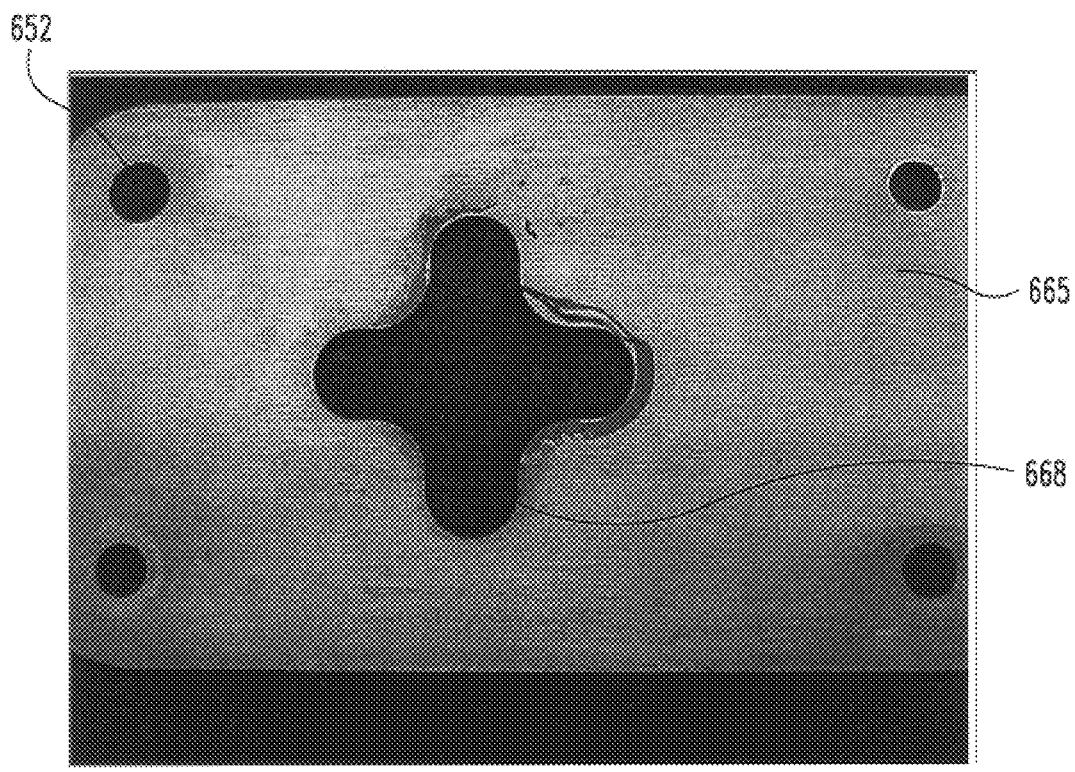
FIG. 17 is a computer-rendered image of a layer of the mold of FIG. 15.

FIG. 15 shows a mold 650 constructed according to one embodiment of the present invention. Mold 650 includes thick layers 660 and 670, and a plurality of thin layers 665 located therebetween. Referring to FIG. 16, each layer 665 includes a sloping edge 668 which is a ruled surface. Each layer 665 is fabricated with a wire EDM method. FIG. 17 shows a single layer 665 and ruled surface 668. Mold assembly 650 includes a plurality of bolt holes 652 for maintaining compression within the assembly.

One aspect of the present invention concerns a method for making a mold of an object. The method includes designing first and second layers representing portions of the object, the first layer having a thickness different than the thickness of the second layer, one of the first layer or the second layer including a curved edge. The method includes remodeling the curved edge of the one layer to include at least one straight edge that is oblique to both the top and bottom surfaces of the one layer. The method includes shaping a first solid member to correspond to the shape of the first layer. The method includes shaping a second solid member to correspond to the shape of the second layer. Another aspect of the present invention concerns a method for making an object. The method includes providing a first solid member, a second solid member, and a machining apparatus capable of machining linear sloping edges, and preferably having multi-axis capability. The method includes drawing first and second layers, a first layer corresponding to the first solid member and a second layer corresponding to the second solid member, the first layer having a thickness different than the thickness of the second layer. Some surfaces of the first and second layers are ruled surfaces.

Another aspect of the present invention concerns a method for making an object. The method includes preparing a model including a shape of the object. The method includes dividing a first portion of the model into a plurality of layers, each layer having an edge, each layer including at least one joining feature, some surfaces of the plurality of layers being ruled surfaces. The method includes dividing a second portion of the model into a plurality of primitive objects, each primitive object including at least one joining feature, some surfaces of each of the plurality of primitive objects being ruled surfaces. The method includes shaping each of a first plurality of solid members into a shape corresponding to a different one of the plurality of layers, said shaping being performed by a process capable of machining sloping linear surfaces. The method includes shaping each of a second plurality of solid members into a shape corresponding to a different one of the plurality of primitive objects, said shaping being performed by a process capable of machining sloping linear.

Another aspect of the present invention concerns a method for making a mold of an object. The method includes preparing a model including a shape complementary to the shape of the object. The method includes dividing a first portion of the model into a plurality of layers, each layer including at least one joining feature on each of said layers, some surfaces of the plurality of layers being ruled surfaces. The method includes assembling a plurality of solid members with the joining features corresponding to the plurality of layers from two different directions into a mold.

Another aspect of the present invention includes a method for making a mold of an object. The method includes providing a first solid member having a first thickness, a second solid member having a second thickness, and a third solid member having a third thickness, the first thickness being less than the second thickness or the third thickness. The method includes preparing three layers, each layer including a surface representing a portion of the surface of the object, each layer having a thickness corresponding to the thickness of one of the first solid member, second solid member, or third solid member; some surfaces of each of the three layers being ruled surfaces. The method includes shaping each of the solid members into a shape corresponding to a different one of the plurality of layers. The method includes assembling the three solid members into a mold such that the first solid member is between the second solid member and the third solid member.

A further method of the present invention includes: selecting a shape to be molded; generating a model to make a mold for the object with a computer, the model including a number of layers of different thicknesses; machining a number of sheets of a metallic material each corresponding to a different one of the layers; and assembling the sheets after said machining to provide at least a portion of the mold. The machining can be with an electrodischarge machine and/or laser. The method can include making one or more objects with the mold.

Still a further method of the present invention includes: selecting a shape to be molded; generating a model to make a mold for the object with a computer; machining a number of sheets of a metallic material to each terminate in a different obliquely angled edge, the sheets each corresponding to a different one of the layers; and assembling the sheets after said machining to provide at least a portion of the mold. The machining can be with an electrodischarge machine and/or laser. The method can include making one or more objects with the mold. Alternatively or additionally, the sheets and/or layers each have a different thickness.

All publications, patents, and patent applications cited in this specification are herein incorporated by reference as if each individual publication, patent, or patent application were specifically and individually indicated to be incorporated by reference. While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the inventions disclosed are desired to be protected.

What is claimed is:

1. A method for making an object, comprising:
   preparing a model including a shape of the object;
   dividing a first portion of the model into a plurality of layers, each layer including a surface portion corresponding to a portion of the shape of the object, each surface portion of the plurality of layers being a ruled surface;
   dividing a second portion of the model into a plurality of primitive objects, each primitive object including a surface portion corresponding to a portion of the shape of the object, each surface portion of the plurality of primitive objects being a ruled surface;

machining each of a first plurality of solid members into a shape corresponding to a different one of the plurality of layers, said machining being one chosen from the group consisting of wire electrodischarge machining and laser machining; and machining each of a second plurality of solid members into a shape corresponding to a different one of the plurality of primitive objects, said machining being one chosen from the group consisting of wire electrodischarge machining and laser machining.

2. The method of claim 1 wherein the object is a mold.

3. The method of claim 2 wherein each layer includes at least one joining feature, each primitive object includes at least one joining feature, each surface of the joining features having a ruled surface.

4. The method of claim 2 which further comprises molding one or more of the objects with the mold.

5. The method of claim 2 which further comprises assembling the first plurality of solid members and the second plurality of solid members into the mold.

6. The method of claim 1 wherein said plurality of layers includes a first layer of a first thickness and a second layer of a thickness different than the first thickness.

7. The method of claim 6 wherein the first layer has a first constant thickness and the second layer has a second constant thickness.

8. The method of claim 7 wherein the portion of the object includes a variably curving surface, and the thickness of each of the plurality of layers is chosen to correspond to the curvature of the object surface such that thinner layers correspond to portions of the object with greater curvature and thicker layers correspond to portions of the object with lesser curvature.

9. A method for making an object, comprising:

providing a first solid member, a second solid member, and a machining apparatus chosen from the group consisting of wire electrodischarge machining and laser machining;

providing a model of at least a first portion of the object;

dividing the model to have a first layer corresponding to the first solid member and a second layer corresponding to the second solid member, said first layer having a thickness different than the thickness of said second layer, each of said first and second layers including a surface portion corresponding to a portion of the shape of the object, each surface portion of said first and second layers capable of being shaped with the machining apparatus;

shaping the surface portion of the first solid member with the machining apparatus to correspond to the shape of the first layer;

shaping the surface portion of the second solid member with the machining apparatus to correspond to the shape of the second layer;

assembling the first solid member and the second solid member to form at least a part of the object;

providing a primitive object model for a second portion of the object;

shaping a third solid member with the machining apparatus to correspond to the shape of the primitive object model; and joining said third solid member to said first and second solid members.

10. The method of claim 9 wherein the first portion of the object includes a variably curving surface, and the thinner of the first layer or the second layer includes a surface corresponding to the portion of the object with greater curvature, and the thicker of the first layer or the second layer includes a surface corresponding to the portion of the object with lesser curvature.

11. The method of claim 10 wherein the first and second layers include a surface portion corresponding to a portion of the shape of the object, the surface portion of the first and second layers being a ruled surface.

12. The method of claim 11 wherein each surface of the first and second layers is a ruled surface.

13. The method of claim 9 wherein the object is a mold representing the shape of a second object.

14. The method of claim 13 wherein said model is a computer model.

15. The method of claim 13 wherein said model is a drawing.

16. The method of claim 9 wherein the first layer and the second layer include substantially parallel opposing surfaces.

17. A method for making an object, comprising:

providing a first solid member, a second solid member, and a machining apparatus chosen from the group consisting of wire electrodischarge machining and laser machining;

providing a model of at least a portion of the object;

dividing a portion of the model to have a first layer corresponding to the first solid member and a second layer corresponding to the second solid member, said first layer having a thickness different than the thickness of said second layer, each of said first and second layers including a surface portion corresponding to a portion of the shape of the object, each surface portion of said first and second layers capable of being shaped with the machining apparatus;

shaping the surface portion of the first solid member with the machining apparatus to correspond to the shape of the first layer;

shaping the surface portion of the second solid member with the machining apparatus to correspond to the shape of the second layer;

assembling the first solid member and the second solid member to form at least a part of the object;

dividing a second portion of the model into a plurality of primitive objects, each said primitive object including a surface portion corresponding to a portion of the shape of the object, each surface portion of said primitive objects capable of being shaped with the machining apparatus; and shaping the surface portion of a plurality of solid members with the machining apparatus to correspond to the shape of said primitive objects.

18. A method for making a mold of an object, comprising:

preparing a model including a shape complementary to the shape of the object;

dividing a first portion of the model into a plurality of layers, each layer including at least one joining feature on each of said layers;

machining each of a plurality of solid members into a shape corresponding to a different one of the plurality of layers, said machining being by a method chosen from the group consisting of wire electrodischarge machining and laser machining; and assembling the plurality of solid members from two different directions with the joining features into at least a portion of a mold.

19. The method of claim 18 wherein the joining features are of a common configuration.

20. The method of claim 18 which further comprises:

fabricating a joining fixture, the joining fixture including a joining portion adapted and configured to slidingly accept in two non-parallel directions the joining feature of each solid member; and sliding during said assembling one or more of the machined solid members onto the joining fixture in a first direction and sliding one or more of the machined solid members onto the joining fixture in a second direction not parallel to the first direction.

21. The method of claim 20 wherein each surface of the joining portion is a ruled surface; and which further comprises machining the joining fixture, said machining being a method chosen from the group consisting of wire electrodischarge machining and laser machining.

22. The method of claim 18 wherein each layer has a thickness different than the thickness of at least one of the other of the plurality of layers.

23. The method of claim 22 wherein each of said plurality of layers are layers of substantially constant thickness.

24. The method of claim 18 wherein each layer includes a surface portion corresponding to a portion of the shape of the object, each surface portion of the plurality of layers being a ruled surface.

25. A method for making an object, comprising:

creating a computer model of the object with a CAD program;

slicing a first portion of the model in a first direction to create a first plurality of layers;

slicing a second portion of the model in a different direction to create a second plurality of layers;

machining a first plurality of solid members into shapes respectively corresponding to the shapes of said layers in said first plurality of layers;

machining a second plurality of solid members into shapes respectively corresponding to the shapes of said layers in said second plurality of layers; and assembling said first and second pluralities of solid members in first and second non-parallel directions, respectively.

26. The method of claim 25, wherein said machining is performed with a wire electrodischarge machine.

27. The method of claim 26, wherein said first and second portions of the model are sliced in directions which are substantially perpendicular to each other, and wherein said first and second directions of assembly are substantially perpendicular to each other.

* * * * *

UNITED STATES PATENT AND TRADEMARK OFFICE
CERTIFICATE OF CORRECTION

PATENT NO. : 6,627,835 B1
DATED : September 30, 2003
INVENTOR(S) : Chan Woo Chung et al.

It is certified that error appears in the above-identified patent and that said Letters Patent is hereby corrected as shown below:

Column 2,
Line 22, please change "eletrodischarge" to -- electrodischarge --

Column 9,
Line 7, please change "unsectioneed" to -- unsectioned --

Column 11,
Line 14, please change "groves" to -- grooves --

Column 12,
Line 53, please change "for" to -- four --

Signed and Sealed this

Twenty-first Day of June, 2005

JON W. DUDAS
*Director of the United States Patent and Trademark Office*